(12) United States Patent
Arribas et al.

(10) Patent No.: US 8,493,978 B2
(45) Date of Patent: Jul. 23, 2013

(54) DISTRIBUTED MASTER ELECTION

(75) Inventors: Marta San Martin Arribas, Madrid (ES); Dennis Henriksen, Copenhagen (DK); Jorge Nevado Jimenez, Alpedrete (Madrid) (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 214 days.

(21) Appl. No.: 13/122,517

(22) PCT Filed: Sep. 30, 2009

(86) PCT No.: PCT/IB2009/007030
§ 371 (c)(1),
(2), (4) Date: Apr. 4, 2011

(87) PCT Pub. No.: WO2010/038149
PCT Pub. Date: Apr. 8, 2010

(65) Prior Publication Data
US 2011/0188506 A1    Aug. 4, 2011

Related U.S. Application Data

(60) Provisional application No. 61/102,482, filed on Oct. 3, 2008, provisional application No. 61/103,147, filed on Oct. 6, 2008.

(51) Int. Cl.
*H04L 12/28* (2006.01)
(52) U.S. Cl.
USPC .......................................... 370/390; 370/400
(58) Field of Classification Search
USPC .......................... 370/390, 396, 400
See application file for complete search history.

(56) References Cited

U.S. PATENT DOCUMENTS

| | | | |
|---|---|---|---|
| 5,752,196 A * | 5/1998 | Ahvenainen et al. | 455/518 |
| 6,539,381 B1 | 3/2003 | Prasad | |
| 2002/0085506 A1 * | 7/2002 | Hundscheidt et al. | 370/254 |
| 2004/0213230 A1 * | 10/2004 | Douskalis et al. | 370/390 |
| 2006/0149799 A1 * | 7/2006 | Wong et al. | 707/204 |

* cited by examiner

*Primary Examiner* — Hong Cho

(57) ABSTRACT

A transmitting node in a telecommunications network, wherein data are distributed into one or more data storage groups (DSG), and wherein data related to a DSG is replicated into a plurality of data storage elements (DS) distributed along one or more nodes of the network. The transmitting node includes a network interface through which a bi-directional connection is established with a plurality of other nodes in a transport layer of the network, and from which messages are sent to the plurality of other nodes comprising an operational state matrix (OSM), which includes information held by the transmitting node about the operational state of the replicas of the DSs of each DSG. The transmitting node includes a memory for storing data. The transmitting node includes a processing unit which forms a list of the plurality of other nodes as having an answer pending of the node in the memory. The network interface receives an OSM from at least some of other nodes which are interpreted by the processing unit as answer messages from the list of the plurality of other nodes to the messages sent by the network interface, and which indicates that an OSM information exchange with the plurality of the other nodes is complete. The processing unit decides a node hosting the master DS replica of each DSG based on the OSM information exchange. The processing unit detects changes in a view of the world (VOW) which includes an accumulated set of OSMs with respect to each DSG hosted by the transmitting node. The network interface sends messages comprising changes in the VOW to the other nodes.

26 Claims, 17 Drawing Sheets

|  | | Node | | | | |
|---|---|---|---|---|---|---|
|  | | 1 | 2 | 3 | ... | n |
| DSG | 1 | RR | RR | AB | | |
| | 2 | AB | RR | RR | | |
| | 3 | RR | AB | RR | | |
| | ... | | | | | |
| | m | | | | | |

FIG. 7

|  | | Node | | | | |
|---|---|---|---|---|---|---|
|  | | 1 | 2 | 3 | ... | n |
| DSG | 1 | RR | RR | AB | | |
| | 2 | AB | RR | RR | | |
| | 3 | RR | AB | RR | | |
| | ... | | | | | |
| | m | | | | | |

FIG. 8

|  | | Node | | | | |
|---|---|---|---|---|---|---|
|  | | 1 | 2 | 3 | ... | n |
| DSG | 1 | RR | RR | AB | | |
| | 2 | AB | RR | RR | | |
| | 3 | RR | AB | RR | | |
| | ... | | | | | |
| | m | | | | | |

FIG. 9

| DSG | Reliable | Node | | | | |
|---|---|---|---|---|---|---|
| | | 1 | 2 | 3 | ... | n |
| V1 | 1 | RR | UR | AB | | |
| | 2 | AB | UR | RR | | |
| | 3 | RR | AB | RR | | |
| | ... | | | | | |
| | m | | | | | |

| DSG | Unreliable | Node | | | | |
|---|---|---|---|---|---|---|
| | | 1 | 2 | 3 | ... | n |
| V2 | 1 | UR | RR | AB | | |
| | 2 | AB | RR | UR | | |
| | 3 | UR | AB | UR | | |
| | ... | | | | | |
| | m | | | | | |

| DSG | Reliable | Node | | | | |
|---|---|---|---|---|---|---|
| | | 1 | 2 | 3 | ... | n |
| V3 | 1 | RR | UR | AB | | |
| | 2 | AB | UR | RR | | |
| | 3 | RR | AB | RR | | |
| | ... | | | | | |
| | m | | | | | |

FIG. 10

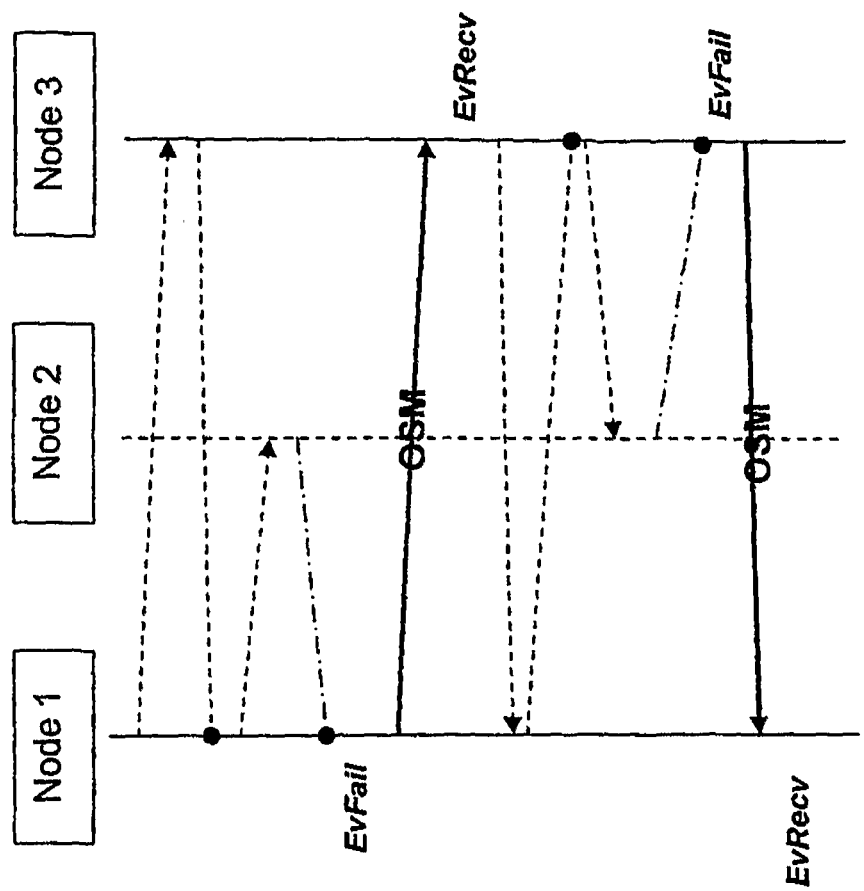
FIG. 11
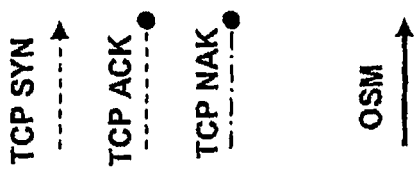

V1 Reliable

| DSG \ Node | 1 | 2 | 3 |
|---|---|---|---|
| 1 | RR | UR | AB |
| 2 | AB | UR | RR |
| 3 | RR | AB | RR |

V2 Derived

| DSG \ Node | 1 | 2 | 3 |
|---|---|---|---|
| 1 | UR | RR | AB |
| 2 | AB | RR | RR |
| 3 | UR | AB | RR |

V3 Reliable

| DSG \ Node | 1 | 2 | 3 |
|---|---|---|---|
| 1 | RR | RR | AB |
| 2 | AB | RR | RR |
| 3 | RR | AB | RR |

V1 Derived

| DSG \ Node | 1 | 2 | 3 |
|---|---|---|---|
| 1 | RR | UR | AB |
| 2 | AB | UR | RR |
| 3 | RR | AB | RR |

V2 Reliable

| DSG \ Node | 1 | 2 | 3 |
|---|---|---|---|
| 1 | UR | RR | AB |
| 2 | AB | RR | UR |
| 3 | UR | AB | UR |

V3 Derived

| DSG \ Node | 1 | 2 | 3 |
|---|---|---|---|
| 1 | RR | UR | AB |
| 2 | AB | UR | RR |
| 3 | RR | AB | RR |

3

| DSG | Node | | |
|---|---|---|---|
| | 1 | 2 | 3 |
| 1 | RR | UR | AB |
| 2 | AB | UR | RR |
| 3 | RR | AB | RR |

V1 Reliable

| DSG | Node | | |
|---|---|---|---|
| | 1 | 2 | 3 |
| 1 | RR | UR | AB |
| 2 | AB | UR | RR |
| 3 | RR | AB | RR |

V2 Derived

| DSG | Node | | |
|---|---|---|---|
| | 1 | 2 | 3 |
| 1 | UR | RR | AB |
| 2 | AB | RR | UR |
| 3 | UR | AB | UR |

V3 Reliable

| DSG | Node | | |
|---|---|---|---|
| | 1 | 2 | 3 |
| 1 | RR | UR | AB |
| 2 | AB | UR | RR |
| 3 | RR | AB | RR |

| DSG | Node | | |
|---|---|---|---|
| | 1 | 2 | 3 |
| 1 | AB | RR | AB |
| 2 | AB | RR | AB |
| 3 | AB | AB | AB |

V1 Reliable

| DSG | Node | | |
|---|---|---|---|
| | 1 | 2 | 3 |
| 1 | RR | RR | AB |
| 2 | AB | RR | RR |
| 3 | RR | AB | RR |

V2 Reliable

| DSG | Node | | |
|---|---|---|---|
| | 1 | 2 | 3 |
| 1 | RR | RR | AB |
| 2 | AB | RR | RR |
| 3 | RR | AB | RR |

V3 Reliable

| DSG | Node | | |
|---|---|---|---|
| | 1 | 2 | 3 |
| 1 | RR | RR | AB |
| 2 | AB | RR | RR |
| 3 | RR | AB | RR |

2
| DSG | Node 1 | Node 2 | Node 3 |
|---|---|---|---|
| 1 | RR | RR | AB |
| 2 | AB | RR | UR |
| 3 | RR | AB | UR |

V1 Reliable
| DSG | Node 1 | Node 2 | Node 3 |
|---|---|---|---|
| 1 | RR | RR | AB |
| 2 | AB | RR | RR |
| 3 | RR | AB | RR |

V2 Reliable
| DSG | Node 1 | Node 2 | Node 3 |
|---|---|---|---|
| 1 | RR | RR | AB |
| 2 | AB | RR | UR |
| 3 | RR | AB | UR |

V3 Reliable
| DSG | Node 1 | Node 2 | Node 3 |
|---|---|---|---|
| 1 | RR | UR | AB |
| 2 | AB | UR | RR |
| 3 | RR | AB | RR |

FIG. 18

1
| DSG | Node 1 | Node 2 | Node 3 |
|---|---|---|---|
| 1 | RR | RR | AB |
| 2 | AB | RR | RR |
| 3 | RR | AB | RR |

V1 Reliable
| DSG | Node 1 | Node 2 | Node 3 |
|---|---|---|---|
| 1 | RR | RR | AB |
| 2 | AB | RR | RR |
| 3 | RR | AB | RR |

V2 Reliable
| DSG | Node 1 | Node 2 | Node 3 |
|---|---|---|---|
| 1 | RR | RR | AB |
| 2 | AB | RR | UR |
| 3 | RR | AB | UR |

V3 Unreliable
| DSG | Node 1 | Node 2 | Node 3 |
|---|---|---|---|
| 1 | RR | UR | AB |
| 2 | AB | UR | RR |
| 3 | RR | AB | RR |

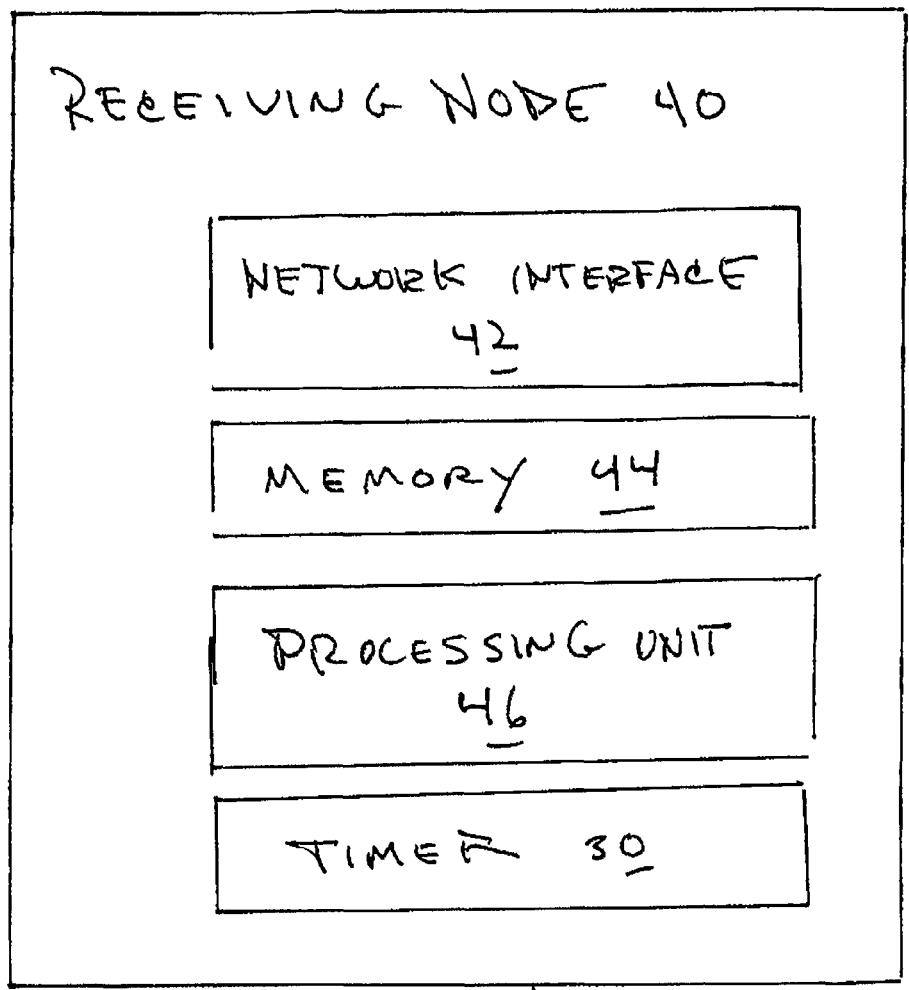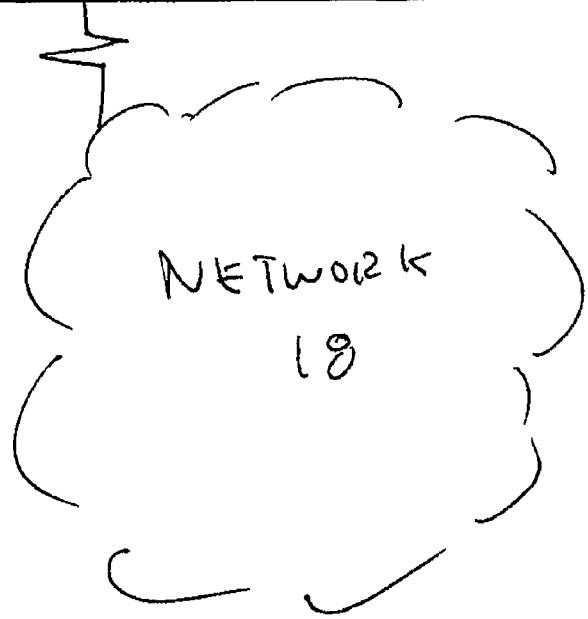
FIG. 24

DISTRIBUTED MASTER ELECTION

This application claims the benefit of U.S. Provisional Application No. 61/102,482, filed Oct. 3, 2008 and U.S. Provisional Application No. 61/103,147 filed Oct. 6, 2008, the disclosures of which are fully incorporated herein by reference.

TECHNICAL FIELD

The present invention is related to the election of master replicas of data in a telecommunications network, wherein data are distributed into one or more data storage groups (DSG), and wherein data related to a DSG is replicated into a plurality of data storage elements (DS) distributed along one or more nodes of the network. (As used herein, references to the "present invention" or "invention" relate to exemplary embodiments and not necessarily to every embodiment encompassed by the appended claims.) More specifically, the present invention is related to the election of master replicas in a telecommunications network, wherein data are distributed into one or more DSGs, and wherein data related to a DSG is replicated into a plurality of DSs distributed along one or more nodes of the network after a network interface of a node receives an operational state matrix (OSM) from at least some of other nodes which are interpreted by a processing unit of the node as answer messages from a list of the plurality of other nodes to messages sent by the network interface, and which indicates that an OSM information exchange with the plurality of the other nodes is complete.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Traditionally, information and telecommunications services have been offered based on the use of monolithic servers. Such a kind of servers comprise processing logic and data storage capabilities that allow them to process the signaling they can receive, as well as the signaling to be sent, by using data they store internally.

However, factors such as, among others: scalability, performance or deployment/implementation cost, are starting to drive towards another kind of solution, wherein the functionality provided by some monolithic servers is -say-"tiered" resulting into a layered architecture. In brief, the principle behind this kind of solution consists on decoupling the service logic processing from the mere data storage.

A layered architecture comprises, in essence: a plurality of signaling front-ends FEs and a back-end database server system DBS. In short, the FEs comprise the necessary signaling and processing means for providing the specific service(s) they serve, while the DBS merely stores the data that can be needed by a FE for processing a service. Depending on factors, such as: the amount of data to be stored, access availability, data distribution policies, etc; the DBS can comprise one or more database nodes DB (e.g. each comprising one machine, or a cluster of machines), wherein, also depending on implementation factors, some data can be replicated in more than one DB.

For example, in a telecommunications system, servers which are being envisaged so as to be adapted according to a layered architecture are, among others: Home Location Registers HLR, Home Subscriber Servers HSS, Device Configuration Registers DCR, Service Policy Controllers SPC (e.g. such as PCRFs, as described in 3GPP specification 23.203 V8.2.0, Jun-2008), Authorization and Authentication servers AAA. These kind of servers, in monolithic implementations, use to hold and store internally data related to a plurality of users, some of which can be common regardless the application/service type served by a specific server, and, therefore, can benefit from a layered architecture implementation, wherein some/all of the user data related to these applications are stored in a common DBS.

In these kinds of layered scenarios, FEs of a telecommunications system (e.g. HLR-FEs, HSS-FEs, DCR-FEs, etc.) can then become (standard) database clients of a database server DBS, which makes possible to use commercially available database solutions rather than devising costly proprietary products. For example, some DBSs available today offer high-performance storage and reliability features, and allow using well-known standardized access protocols, such as the "Lightweight Directory Access Protocol" LDAP, for providing access to many kinds of eventual database clients.

A further advantage of a layered architecture is that the signaling load from service clients of a given service, for example clients of the services provided by a HLR or HSSs (such as e.g.: Mobile Switching Centers/Visitor Location Registers MSC/VLRs, Serving GPRS Support Nodes SGSNs, Call Session Control Functions CSCFs, etc), can be distributed along the plurality of available HLR and/or HSS FEs acting, on the one side, as if they were monolithic HLR/HSS servers for the service clients and, on the other hand, as database clients for the DBS. Therefore, the service availability is increased, since the signaling load due to these clients can be distributed along a plurality of available FEs, which can be selected by using any suitable distribution algorithm. Besides, these FEs can be implemented by -say- "lightweight" machines that do not require a high data storage capacity. Also, operation and maintenance O&M tasks over the necessary user data is simplified, as only the DBS is to be contacted and not a plurality of servers, which also helps to keep data consistency when the same user data is used for more than one application/service.

In summary, as the Telecom networks grow more and more complex, providing an increasing variety of services, the need of a common centralized database for a diversity of applications is more and more evident. In this way services can be introduced in less time and data management becomes simpler, reducing operational expenses (OPEX) and capital expenditures (CAPEX.).

This centralized Telecom database should have at least the following characteristics:

- Resiliency, high availability
- High performance—low latency
- High capacity
- Scalability
- Geographical redundancy
- Flexible deployment
- Single point of access (one in each geographical location)
- No single point of failure Many companies are offering Telecom databases with these characteristics A geographically distributed database provides geographical redundancy, being resilient when disasters occur. But it obliges the clients (such as front-ends of: Home Location Register (HLR), Home Subscriber Servers (HSS), Authentication Center (AuC), etc) to be aware of the data distribution and the status of the database in each location. Therefore, the clients need to be configured individually so as to know in which location the data they need resides, and not only that. It has to know where the copies of the different data are Located.

Issues relating to data distribution and replication along a plurality of database nodes have already been addressed. In this respect, several prior-art documents are cited herein: U.S. Pat. No. 6,539,381 B1 (hereinafter referred as document D1), document "*Adaptable Replica Consistency Service for Data Grids*" (Ruay Shiung et A1; Information Technology: New Generations, 2006. Third International Conference on Las Vegas, April 2006, NV, USA 10-12 Apr. 2006. IEEE. PIS-CATAWAY, N.J., USA, 10 Apr. 2006, pages 646-651. ISBN 978-0-7695-2497-9; hereinafter referred as document D2), or document "*Understanding Replication in Databases and Distributed Systems*" (Distributed Computing Systems, 2000. Proceedings. 20Th International Conference on Taipei. Taiwan 10-13 Apr. 2000, Los Alamitos, Calif., USA. IEEE Comput. Soc, US, 10 Apr. 2000, pages 464-474, ISBN: 978-0-7695-0601-2; hereinafter referred as document D3).

Document D1 discloses a solution for synchronizing the status of data replicas that are distributed along a plurality of database nodes, and to update their contents. According to D1 each database node of the plurality stores information (called "state vectors") with regard to the updating status of every data replica distributed along every other database node, as perceived by a particular node. The "state vectors" of D1 comprise "time stamps" indicating when a particular data replica has been updated on a database node, as perceived by a particular node (e.g. D1: column 9 lines 47-50; column 10 line 43-column 11 line 21; column 12 lines 36-58; FIGS. 4, 5A, 5B, 5C and 5D). According to D1, the database nodes exchange "state vector" information upon change on a data replica on any of them (e.g. D1: column 12 line 36-column 13 line 26). According to D1, a database/network administrator determines which database node holds the master replica (e.g. D1: column 2 lines 8-18; column 9 lines 42-60; column 10 lines 43-48).

Document D2 also addresses data consistency problems when certain data are replicated along a plurality of database nodes of a "data grid" infrastructure comprising database nodes storing a "master" replica of certain replicated data, and database nodes storing read-only (called "secondary") copies of these replicated data, wherein data modifications are made only over master replicas, and wherein modifications are subsequently made on the secondary copy or copies (e.g. D2: Abstract, chapters 1 and 2). In particular, D2 discloses a solution based on a "multi-master" concept, wherein the database nodes of the data grid are divided into "regions" comprising database nodes closely located, wherein each "region" holds one master replica for certain replicated data, and wherein a locking mechanism is used to allow consistency among database nodes when certain replicated data are modified in a database node holding a "master" copy (e.g. D2: chapter 3.2). More precisely, D2 discloses a mechanism for keeping data consistency among nodes holding "master" data replicas in different "regions" upon modification of certain (replicated) data in one of them, wherein said mechanism is based on exchanging between database servers on different regions of "time-stamp" information (referenced therein as "sequence number") indicating at what time a particular master data replica has been updated on a database node (e.g. D2: chapter 3.3). When coming to designating a node hosting a "master replica" for certain replicated data. D2 refers implicitly a manual configuration method as in D1 (e.g. D2: chapter 2 paragraph 2), or explicitly a method based on system loading and network bandwidth (e.g. D2: page 4 left hand column, paragraph 1, lines 16-18).

Document D3 also addresses issues relating to data distribution and replication along a plurality of database nodes, and also discloses a solution wherein data modifications are first made on the database node holding the "master" copy of the concerned data and, then, subsequently replicated to the database node(s) holding copies of said data (e.g. D3: chapter 4.3). Document D3 does not however add any teaching to determine a database node, among a plurality, hosting a "master replica" for certain replicated data.

In summary, the problem of deciding consistently and in a distributed and automated manner which database node host the master replica for a certain data is not addressed in an efficient manner by the prior art.

SUMMARY

The present invention pertains to a transmitting node in a telecommunications network, wherein data are distributed into one or more data storage groups (DSG), and wherein data related to a DSG is replicated into a plurality of data storage elements (DS) distributed along one or more nodes of the network. The transmitting node comprises a network interface through which a bi-directional connection is established with a plurality of other nodes in a transport layer of the network, and from which messages are sent to the plurality of other nodes comprising an operational state matrix (OSM), which includes information held by the transmitting node about the operational state of replicas of the data storage elements (DS) of each data storage group (DSG). The transmitting node comprises a memory for storing data. The transmitting node comprises a processing unit which forms a list of the plurality of other nodes as having an answer pending of the node in the memory. The network interface receives an OSM from at least some of other nodes which are interpreted by the processing unit as answer messages from the list of the plurality of other nodes to the messages sent by the network interface, and which indicates that an OSM information exchange with the plurality of the other nodes is complete. The processing unit decides a node hosting the master DS replica of each data storage group (DSG) based on the OSM information exchange, The processing unit detects changes in a view of the world (VOW) which includes an accumulated set of OSMs with respect to each DSG hosted by the transmitting node. The network interface sends messages comprising changes in the VOW to the other nodes.

The present invention pertains to a receiving node in a telecommunications network, wherein data are distributed into one or more DSGs, and wherein data related to a DSG is replicated into a plurality of DSs distributed along one or more nodes of the network. The receiving node comprises a network interface which accepts a connection attempt from a transmitting node via the network, receives an OSM at the network interface from the transmitting node, and sends, responsive to having received the OSM from the transmitting node, the receiving node's OSM to the transmitting node and at least one other node in the network via the network. The receiving node comprises a memory for storing data. The receiving node comprises a processing unit which forms a list in the memory which list includes at least the other node as having an answer pending. The network interface receiving an OSM from the other node which is interpreted by the processing unit as an answer, which indicates that an exchange with the other node is complete, after which the network interface receives from the transmitting node changes in a VOW.

The present invention pertains to a method for a transmitting node in a telecommunications network, wherein data are distributed into one or more DSGs, and wherein data related to a DSG is replicated into a plurality of DSs distributed along one or more nodes of the network. The method comprises the steps of establishing a bi-directional connection via a network interface of the node with a plurality of other nodes in a transport layer of the network. There is the step of sending from the network interface messages to the plurality of other nodes comprising an OSM, which includes information held by the transmitting node about the operational state of replicas of the DSs of each DSG. There is the step of forming a list of the plurality of other nodes as having an answer pending with a processing unit of the node in a memory of the node. There is the step of receiving at the network interface an OSM from at least some of other nodes which are interpreted by the processing unit as answer messages from the list of the plurality of other nodes to the messages sent in the sending step, and which indicates that an OSM information exchange with the plurality of the other nodes is complete. There is the step of deciding with the processing unit a node hosting the master DS replica of each data storage group (DSG) based on the OSM information exchange. There is the step of detecting with the processing unit changes in a view of the world (VOW) which includes an accumulated set of OSMs with respect to each DSG hosted by the transmitting node. There is the step of sending from the network interface messages comprising changes in the VOW to the other nodes.

The present invention pertains to a method for a receiving node in a telecommunications network, wherein data are distributed into one or more DSGs, and wherein data related to a DSG is replicated into a plurality of DSs distributed along one or more nodes of the network. The method comprises the steps of accepting a connection attempt received by a network interface of the node from a transmitting node via the network. There is the step of receiving an OSM at the network interface from the transmitting node. There is the step of sending, responsive to the step of receiving, from the network interface the node's OSM to the transmitting node and at least one other node in the network via the network. There is the step of forming a list with the processing unit in a memory of the node which list includes at least the other node as having an answer pending. There is the step of receiving an OSM at the network interface from the other node which is interpreted by the processing unit as an answer, which indicates that an exchange with the other node is complete. There is the step of receiving at the network interface from the transmitting node changes in a VOW.

The present invention pertains to a computer program on a computer readable medium for performing separately or together either of the aforementioned methods in whole or in part.

BRIEF DESCRIPTION OF THE DRAWINGS

In the accompanying drawings, the preferred embodiment of the invention and preferred methods of practicing the invention are illustrated in which:

FIG. 7 shows DM@Nn where m=3 and n=2.

FIG. 8 shows D?@Nn, where n=2.

FIG. 9 shows an OSM for a system with three nodes and three DSGs.

FIG. 10 shows VOW at Node 1 for a three node system, with N2 isolated.

FIG. 11 shows node failure detection. Only the main messages are shown for clarity reasons. OSM in FIG. 12 shows OEP message flow.

FIG. 13 shows EvFail VOW updates on connection failure from N1 to N2.

FIG. 14 shows EvFail VOW updates on connect failures from N2 to N1 to N3.

FIG. 15 shows EvRecv at N1 receiving OSM from N3.

FIG. 16 shows EvRecv at N1 upon receiving OSM from N2.

FIG. 17 shows EvRecv at N1 receiving OSM from N2 in a crippled network.

FIG. 18 shows EvRecv at N2 receiving OSM from N1 in a crippled network.

FIG. 24 is a block diagram of a receiving node of the present invention.

DETAILED DESCRIPTION

Figure 23:
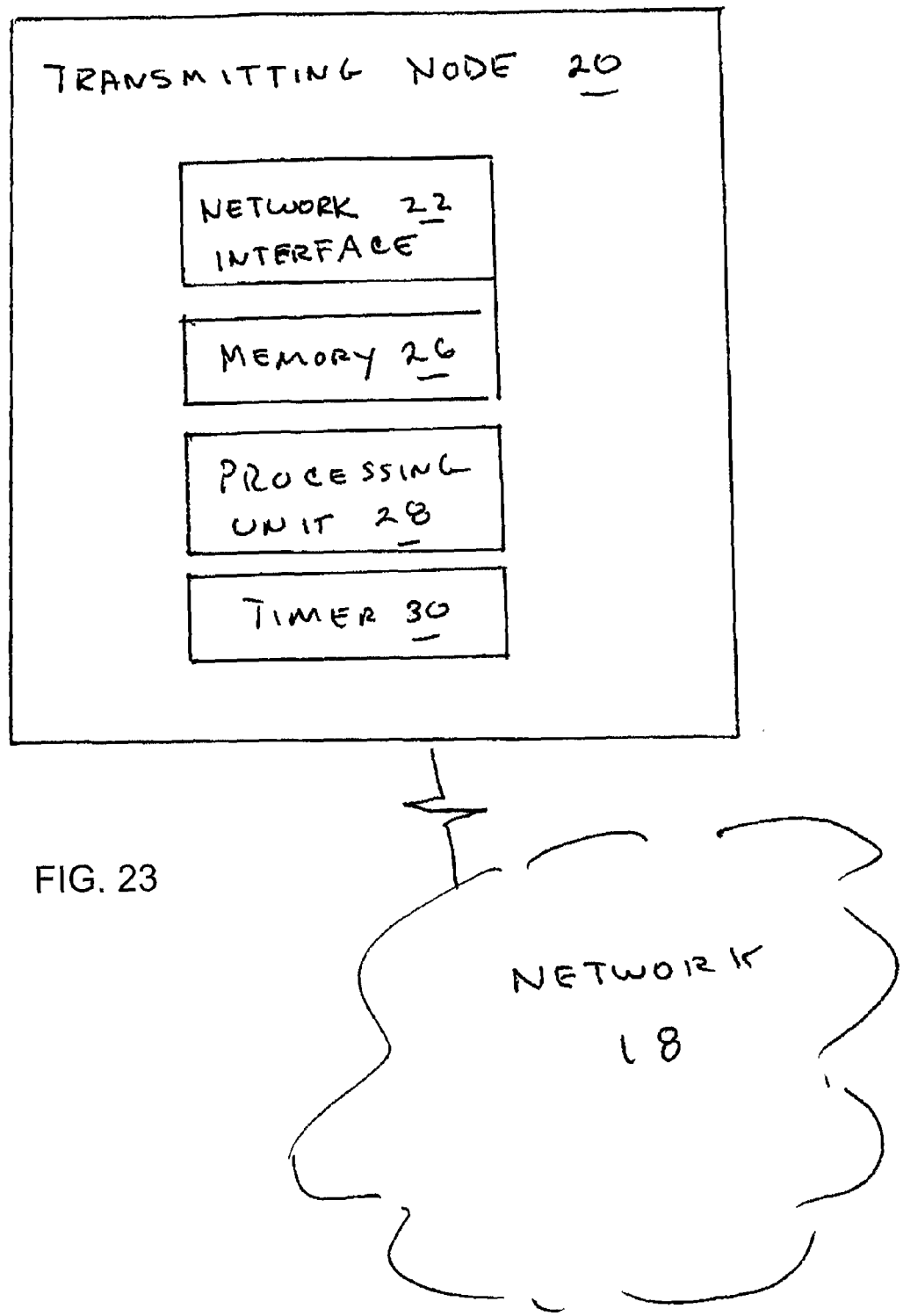
FIG. 23 is a block diagram of a transmitting node of the present invention.

Referring now to the drawings wherein like reference numerals refer to similar or identical parts throughout the several views, and more specifically to FIG. 23 thereof, there is shown a transmitting node 20 in a telecommunications network 18, wherein data are distributed into one or more DSGs, and wherein data related to a DSG is replicated into a plurality of data storage elements (DS) distributed along one or more nodes 24 of the network 18. The transmitting node 20 comprises a network interface 22 through which a bi-directional connection is established with a plurality of other nodes 24 in a transport layer of the network 18, and from which messages are sent to the plurality of other nodes 24 comprising an operational state matrix (OSM), which includes information held by the transmitting node 20 about the operational state of replicas of the data storage elements (DS) of each data storage group (DSG). The transmitting node 20 comprises a memory 26 for storing data. The transmitting node 20 comprises a processing unit 28 which forms a list of the plurality of other nodes 24 as having an answer pending of the node in the memory 26. The network interface 22 receives an OSM from some or all the other nodes 24 which are interpreted by the processing unit 28 as answer messages from the list of the plurality of other nodes 24 to the messages sent by the network interface 22, and which indicates that an OSM information exchange with the plurality of the other nodes 24 is complete. The processing unit 28 decides a node hosting the master DS replica of each data storage group (DSG) based on the OSM information exchange, The processing unit 28 detects changes in a view of the world (VOW) which includes an accumulated set of OSMs with respect to each DSG hosted by the transmitting node 20. The network interface 22 sends messages comprising changes in the VOW to the other nodes 24.

The node may include a timer 30 and wherein the processing unit 28 starts the timer 30 when the OSM in the memory 26 has been sent to all the other nodes 24. The processing unit 28 may stop the timer 30 when an OSM is received by the network interface 22 from all the plurality of other nodes 24. The network interface 22 may resend the OSM in the memory 26 to one of the plurality of other nodes 24 after a predetermined period of time has passed and an OSM from the one of the plurality of other nodes 24 has not been received by the network interface 22. The network interface 22 may send a replica of at least one data group of a plurality of data groups of data stored in the DS to at least one other node, so the replica is stored in a DS of at least one other node. The network interface 22 may send a request for data at a data group disposed in at least one other node.

The present invention pertains to a receiving node 40, as shown in FIG. 24 in a telecommunications network 18, wherein data are distributed into one or more DSGs, and wherein data related to a DSG is replicated into a plurality of DSs distributed along one or more nodes 24 of the network 18. The receiving node 40 comprises a network interface 42 which accepts a connection attempt from a transmitting node 20 via the network 18, receives an OSM at the network interface 22 from the transmitting node 20, and sends, responsive to having received the OSM from the transmitting node 20, the receiving node's OSM to the transmitting node 20 and at least one other node in the network 18 via the network 18. The receiving node 40 comprises a memory 44 for storing data. The receiving node 40 comprises a processing unit 46 which forms a list in the memory 44 which list includes at least the other node as having an answer pending, the network interface 22 receiving an OSM from the other node which is interpreted by the processing unit 46 as an answer, which indicates that an exchange with the other node is complete, after which the network interface 42 receives from the transmitting node changes in a VOW.

The processing unit 46 may update the OSM stored in the memory 26 after the OSM from the transmitting node 20 is received by the network interface 42.

The present invention pertains to a method for a transmitting node 20 in a telecommunications network 18, wherein data are distributed into one or more DSGs, and wherein data related to a DSG is replicated into a plurality of DSs distributed along one or more nodes 24 of the network 18. The method comprises the steps of establishing a bi-directional connection via a network interface 22 of the node with a plurality of other nodes 24 in a transport layer of the network 18. There is the step of sending from the network interface 22 messages to the plurality of other nodes 24 comprising an OSM, which includes information held by the transmitting node 20 about the operational state of replicas of the DSs of each DSG. There is the step of forming a list of the plurality of other nodes 24 as having an answer pending with a processing unit 28 of the node in a memory 26 of the node. There is the step of receiving at the network interface 22 an OSM from each of the plurality of other nodes 24, or from some of them, which are interpreted by the processing unit 28 as answer messages from the list of the plurality of other nodes 24 to the messages sent in the sending step, and which indicates that an OSM information exchange with the plurality of the other nodes 24 is complete. There is the step of deciding with the processing unit 28 a node hosting a master DS replica of each DSG based on the OSM information exchange. There is the step of detecting with the processing unit 28 changes in a VOW which includes an accumulated set of OSMs with respect to each DSG hosted by the transmitting node 20. There is the step of sending from the network interface 22 messages comprising changes in the VOW to the other nodes 24.

There may be the step of the processing unit 28 starting a timer 30 when the OSM has been sent to all the other nodes 24. There may be the step of the processing unit 28 stopping the timer 30 when an OSM is received by the network interface 22 from all the plurality of other nodes 24. There may be the step of resending from the network interface 22 the OSM of the node to one of the plurality of other nodes 24 after a predetermined period of time has passed and an OSM from the one of the plurality of other nodes 24 has not been received by the network interface 22.

There may be the step of storing a replica of at least one data group of a plurality of data groups of data stored in the DS, in a DS of at least one other node. There may be the step of requesting through the network interface 22 data at a data group disposed in at least one other node. There may be the step of sending updates from the network interface 22 to the DSs of the plurality of DSGs. There may be the step of determining by the processing unit 28 a second node of the plurality of nodes 24 as hosting a master DS replica of a DSG in a third node of the plurality of nodes 24, which hosted the master DS replica, when communication between the network interface 22 and the third node is lost. There may be the step of processing assignation of incoming signaling in a node related to data of a certain DSG with at least one access gateway element (AG) to the plurality of the nodes 24, the AG knowing which DS of a DSG is the master DS replica of the DSG, each DS of the DSG accessible from the network interface 22.

There may be the step of compiling a last update and status of each node of the plurality of nodes 24 by a primary monitoring process with the processing unit 28 to determine the node hosting the master DS replica for a DSG. The compiling step may include the step of forming a configuration with the primary monitoring process which lists all DS replicas in terms of which DSG each DS belongs to, which node each DS is hosted, and a priority within the DSG the DS is associated with in which it acts as a master replica. There may be the steps of the processing unit 28 producing an active DS list (ADL) derived from the configuration; publishing the ADL to the AG; and the AG processing the assignation of incoming signaling related to data of a certain DSG by using the active DS list (ADL). There may be the step of the processing unit 28 deriving the ADL from the VOW.

The present invention pertains to a method for a receiving node 40 in a telecommunications network 18, wherein data are distributed into one or more DSGs, and wherein data related to a DSG is replicated into a plurality of DSs distributed along one or more nodes 24 of the network 18. The method comprises the steps of accepting a connection attempt received by a network interface 42 of the node from a transmitting node 20 via the network 18. There is the step of receiving an OSM at the network interface 42 from the transmitting node 20. There is the step of sending, responsive to the step of receiving, from the network interface 42 the node's OSM to the transmitting node 20 and at least one other node in the network 18 via the network 18. There is the step of forming a list with the processing unit 46 of the receiving node 40 in a memory 44 of the receiving node 40 which list includes at least the other node as having an answer pending. There is the step of receiving an OSM at the network interface 42 from the other node which is interpreted by the processing unit 28 as an answer, which indicates that an exchange with the other node is complete. There is the step of receiving at the network interface 42 from the transmitting node 20 changes in a VOW.

There may be the step of starting a timer 30 by the processing unit 46 when the OSM is sent to the other node by the network interface 42. There may be the step of stopping the timer by the processing unit 46 when the OSM from the other node is received by the network interface 42. There may be the step of updating by the processing unit 46 the node's OSM stored in the memory 44 after the OSM from the transmitting node 20 is received by the network interface 42.

The present invention pertains to a computer program on a computer readable medium for performing separately or together either of the aforementioned methods, in whole or in part.

In the operation of the invention, a Telecom database includes several geographically distributed nodes 24. Each node includes several data storage elements. The distribution of data amongst the DSs is carried out according to FIG. 1.

Figure 1:
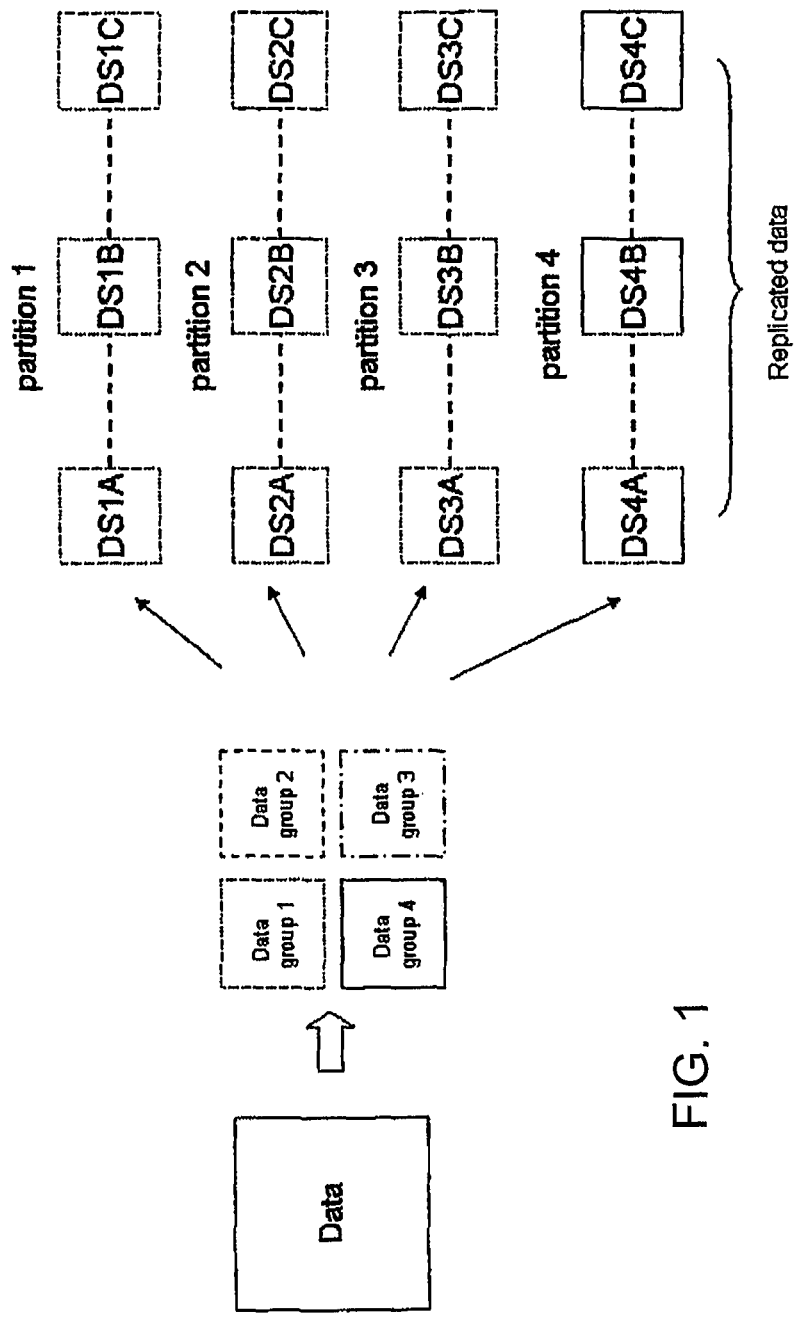
FIG. 1 is a block diagram regarding data partition and replication.

The data to be stored in the database is divided in groups. In FIG. 1, the data is divided in four data groups. Each group of data is stored in two or more DSs, so each DS holds a copy of the whole group of data. In FIG. 1, each data group is stored in three different DSs. So DS1A is the DS that holds a copy or replica of the data group 1. And there are another two replicas of the same data, DS1B and DS1C.

The group of data storage elements that holds replicas of the same data group are called a partition or Data Storage Group (DSG). Therefore partition 1 is composed of DS1A, DS1B and DS1C.

Figure 2:
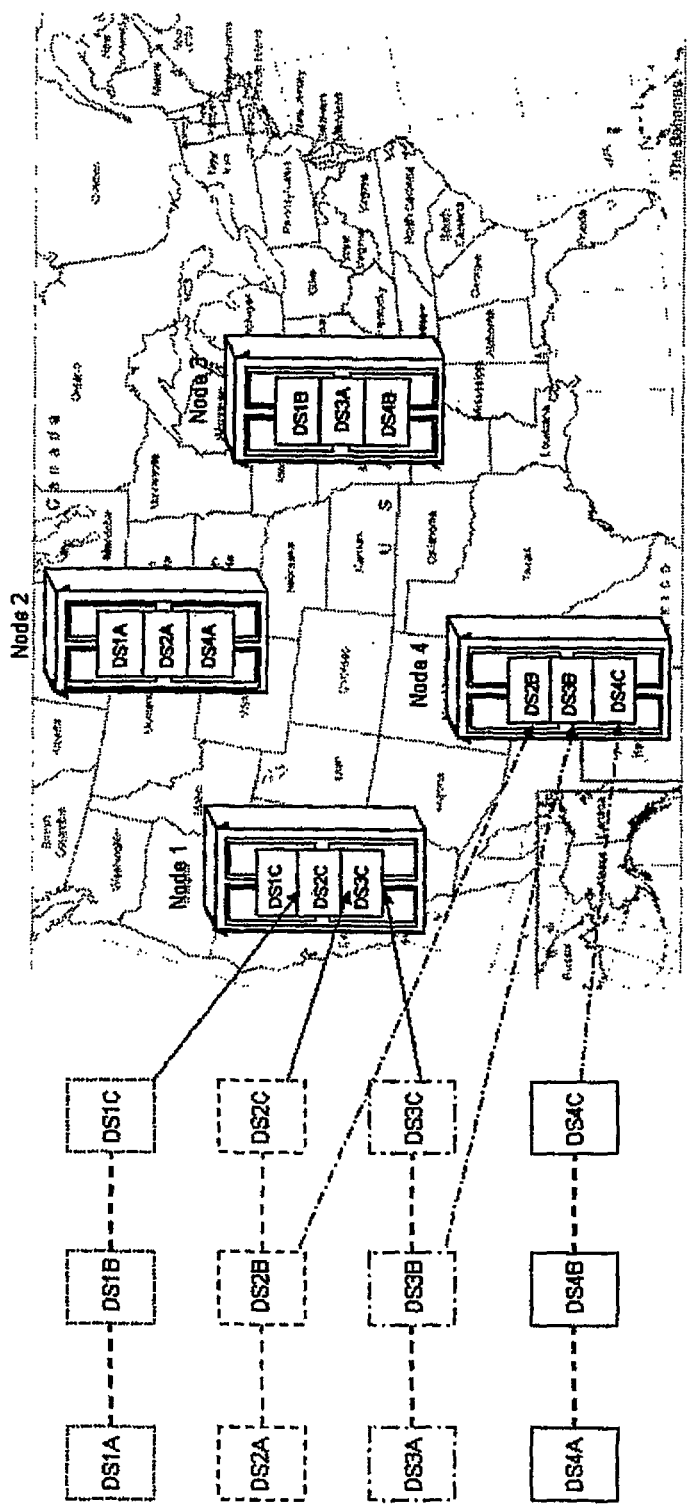
FIG. 2 is a block diagram regarding data distribution.

FIG. 2 shows the distribution of the DSs in the nodes 24. One node may have one DS of each partition, but it is not required.

The clients, as HLR or Auc, access any data from any node of the distributed database. For instance, a client can get data of group 1 accessing node 4, although node 4 doesn't have a local replica of the partition 1.

In order to preserve consistency, preferably, only one of the DSs receives requests for reading and/or writing. This would be the master or active DS. The rest of the DSs could then receive the updates from the master one, and they execute them in order to have the latest changes.

But if the DS holding the replica fails, or loses the network 18 connection, other replica should be appointed as master replica. The mechanism that performs that function is the main subject of the present invention.

Figure 3:
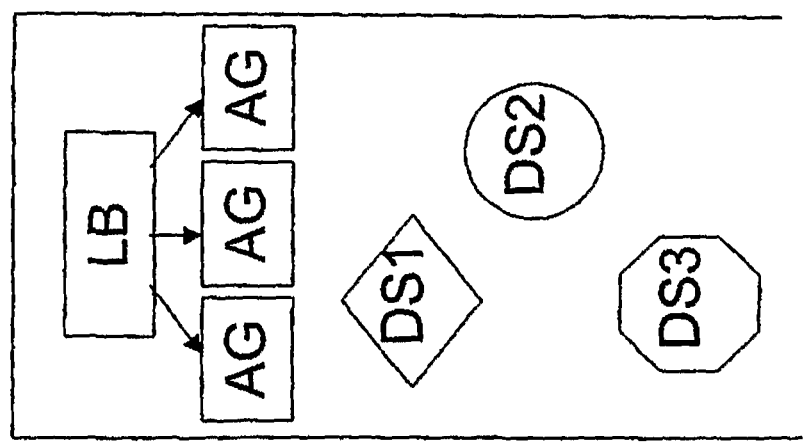
FIG. 3 is a block diagram of a node of the database system of the present invention.

FIG. 3 illustrates a schematic representation of a node handling local copies of data elements partitions: DS1, DS2 and DS3. According to a possible realization, the node of FIG. 3 is illustrated as comprising a load-balancer element (LB), for distributing traffic load due to incoming signaling, and a plurality of access gateway elements (AG) primarily processing the assignation of incoming signaling. However, as will be apparent for the skilled person, these elements are not necessary to be implemented for accomplishing with aspects of the invention.

For example, depending on construction details on a particular node (e.g. whether implemented in a computer machine, or comprised of a plurality of clustered machines), the LB can be a stand-alone entry point for distributing requests addressing the storage resources in a given clustered node, or be located (e.g. as a local distribution process) in a multi-processor machine implementing the node. Similarly, the AG(s) can be considered as instances of process for handling incoming requests, either: in monolithic or multi machine implementations of a node. In summary, LB(s) can therefore be redundant in some node implementations, wherein AG elements are to be considered as the means (e.g. software and/or hardware means) necessary to process signaling traffic in a node according to embodiments of the invention.

As previously stated, the whole database would be accessible from any node. The Access Gateway (AG) is the entity in charge of forwarding the requests to the node where the master DSs is located, and actually accessing the database, since the database protocol may be different from the accessing protocol. Therefore, these AGs need to know which of the DSs of a DSG is the master. If LDAP is used to access the database, this AG can be implemented in a software process.

Figure 4:
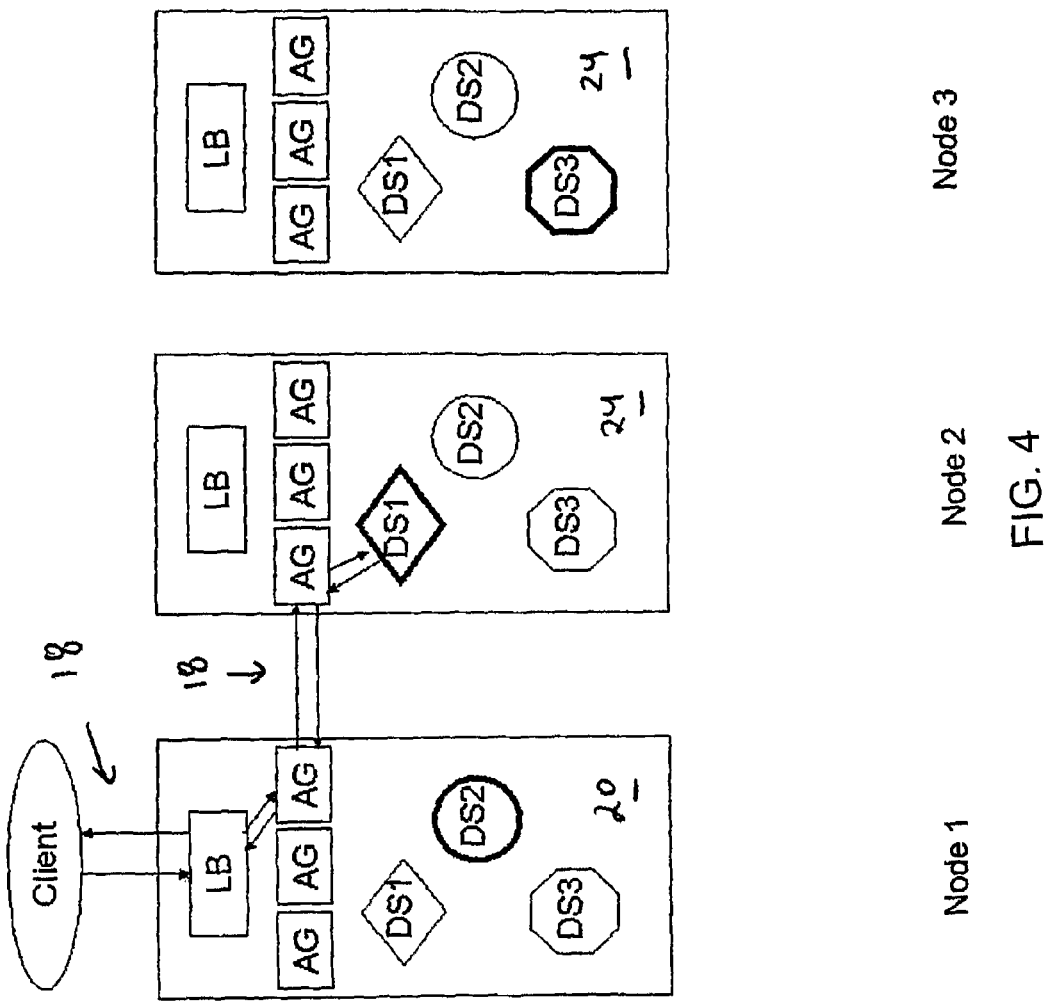
FIG. 4 is a block diagram regarding the process of a request when master DS is remote.
Figure 5:
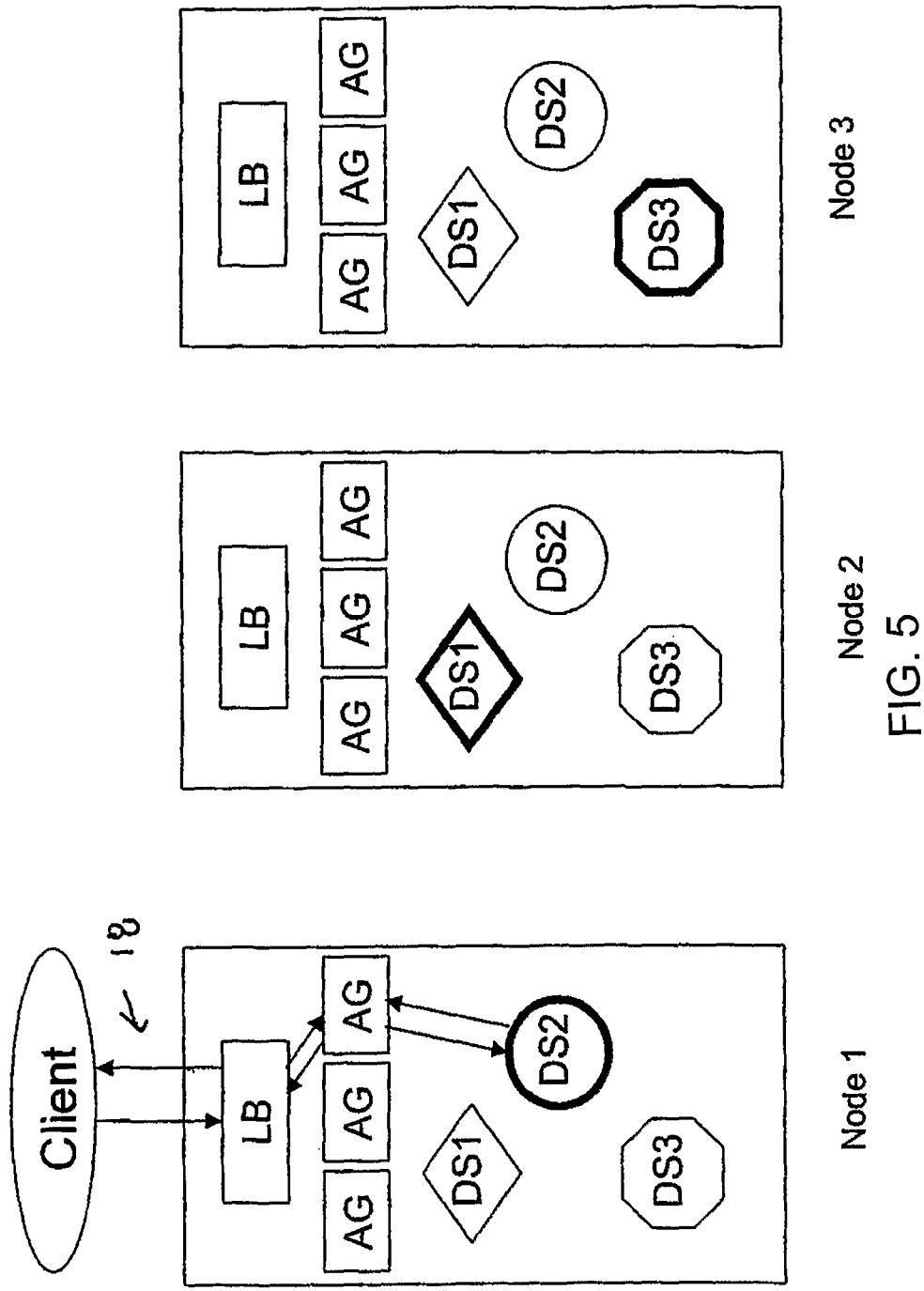
FIG. 5 is a block diagram regarding the process of a request when master DS is local.

Since there can be several AGs in each node to maximize performance, a Load Balancer (LB) is preferably used to distribute traffic amongst them. So a node of the database would look like as it is shown in FIG. 3, and processing of requests would follow the steps shown in FIG. 4 and FIG. 5. The rhombus, circle and octagon in bold in FIG. 3 and FIG. 4 are the master replicas of their respective partitions.

In order to decide who the master replica for a partition is, the status of the different clusters holding replicas has to be taken into account. This status and last update is compiled in each node by the Monitoring Process (MP). In order to have a high available system, this process would have a stand by one that would take over in case the active one fails.

The solution to decide who the master replica of each partition is, takes the following idea as base:

If all LSMs have a consistent view of the operational state of all nodes 24, and share the exact same rules and mechanisms, all LSMs should arrive independently at a consistent decision.

The solution to master assignation problem described in the following assumes the existence of a configuration which lists all DS replicas in terms of which DSG they belong to, where they are hosted and a priority within the DSG in which it should act as master.

In the following three abstractions are used to establish the aforementioned consistent view of the world and used to derive the decisions about master replicas, which in turn are preferably made available to the access gateways processes running in the same node as the Monitoring Process.

OSM—Operational State Matrix; The information exchanged between nodes 24
VOW—View of the World; Multi-matrical structure: accumulated set of OSMs. The information on which ADLs are derived.
ADL—Active DS List; The information conveyed to AGs to allow them to route the request to the right DS.

No distributed concept is complete without a means of exchanging information; the solution described herein is no exception, so an inter-node protocol to this end is also set forth in the following.

Aspects of the invention will now be described with respect to some exemplary embodiments in an illustrative and non-restrictive manner. Variations can be readily apparent to those of ordinary skill in the art.

Operational State Matrix. OSM

The OSM is an abstract representation of the operational state of all replicas in the entire system, as seen from a single node, Nx (or Monitoring Process hosted herein). For the purpose of the suggested solution an OSM should be an n×m matrix, where n is the number of nodes 24 and m is the number of DSGs (See FIG. 9). The dimensions of the matrix, should be considered being dynamic to allow for node additions and removals. Each cell corresponds to a replica, Dm, hosted at a node, Nn. In the following Dm@Nn is meant to denote a specific cell in such a matrix (See FIG. 7) and D?@Nn denotes all cells pertaining to node Nn (See FIG. 8).

The state (or value in a cell) for any given Dm@Nn can be:

AB (Absent)—Meaning that no operational replica of Dm is hosted at node Nn. Note that whenever a DS replica is deemed to be non-operational it is equivalent to it being absent in this context.

RR (Reachable Replica)—Meaning that an operational replica of Dm is hosted at node Nn. In OSMs in other nodes Nx this also means the replica is accessible. (I.e. when n≠x).

UR (Unreachable Replica)—Meaning that the replica Dm hosted at node Nn cannot be reached from the node Nx owning the OSM. Obviously this state should never occur in D?@Nx.

Figure 6:
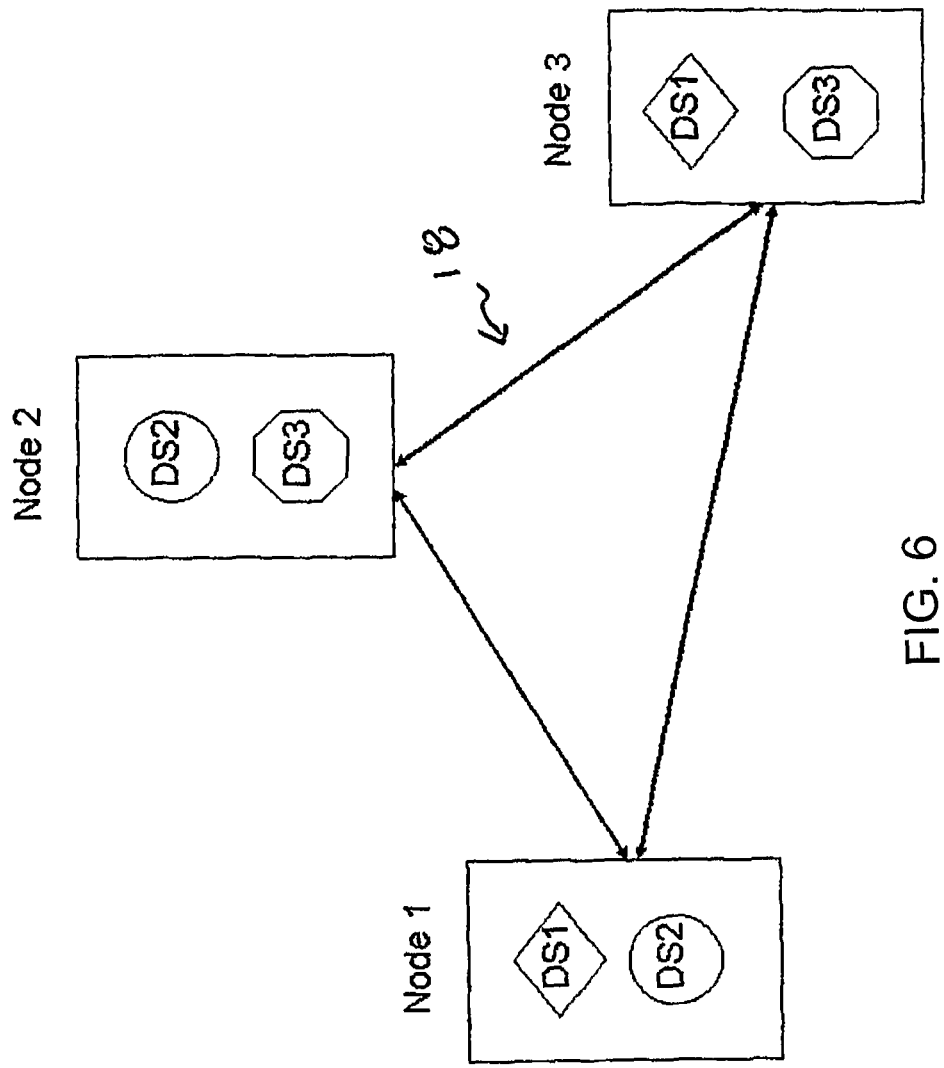
FIG. 6 is a block diagram of a three node system with two replicas per partition.

Assuming as system with 3 nodes, 3 DSGs each with 2 replicas as shown in FIG. 6; the OSM for a full operational system would appear as depicted in the FIGS. 7-9 in all nodes.

How an OSM is maintained and how it is being used, is described below.

View of the World, VOW

Every node maintains a copy of OSMs from every node in the entire system. Each of these OSMs can contain either reliable information or unreliable information. The two qualifications on the individual elements of the VOW, serves to distinguish between which elements to consider in the process of deriving an ADL.

The reliable elements are derived from facts in terms of OSM received from other nodes 24, whereas the unreliable elements are solely based on calculations (informed guesses).

The OSM pertaining to the node itself is in fact just one of the elements in the whole set, which is treated slightly different from the rest.

When Vn refers to a specific OSM in the VOW, Vn can be used as a prefix to the Dm@Nn to identify a single cell within the VOW. This means that the OSM at node N1 is that same as the V1 element in the VOW. FIG. 10 illustrates the multimatrical structure of the VOW at Node 1. [V1] represents the (own) OSM of Node 1. [V2] and [V3] represent the OSM of, respectively, nodes 2 and 3 as "perceived" by Node 1 (i.e. by receiving/collecting OSM information from these nodes). How information in the VOW of a node is set, is detailed in subsequent chapters.

Active DS List, ADL

ADL used herein is merely the essential information; other information like storage usage etc can be added if needed. The essential thing about the ADL is that it only lists identified Master Replicas in terms of a DSG identifier and a Node identifier. It is in fact the routing table used by AGs to know where to redirect the requests. It may look like the following table:

| Partition | Node |
|---|---|
| 1 | 3 |
| 2 | 2 |
| 3 | 1 |

Protocols

ADL Related Protocol

To provide ADLs to Access Gateways (and other possible subscribers), the monitoring process can use simple UDP based multicast protocol. This protocol is described below. For the purpose of the description of this solution to the Master Assignation problem, the key points are the actions that signals that previously conveyed ADLs are invalid, mc_expire, and that convey derived ADL, mc_config or mc_refresh.

OEP—OSM Exchange Protocol

OEP is a protocol preferably over TCP, but any other connection oriented protocol is valid as well. Ideally the information exchange should be done as a kind of broadcast. Regular broadcasts are however not a feasible option. FIG. 11 shows the suggested network 18 traffic in a three node system with one node isolated.

FIG. 11 means the message of OEP that carries OSM information.

The sequence of events depicted in FIG. 11 is as follows:

N1 attempts to connect to N2 and N3. One of these attempts fails

N1's OSM is altered to reflect the failure

N1 sends the updated OSM on all its current connection: In this case to N3

N3 receives the OSM from N1, stores it, and preferably interprets it as a question N3 in turn attempts to establish connections to all other nodes: The one toward N2 fails N3 updates its OSM N3 sends its OSM to N1.

The following is devoted to a description of a replacement to broadcasting. It is TCP based and consists of two phases.

1. Establishing transport layer (TCP) connections to all available nodes

2. Optionally an application layer OSM exchange along all open connections.

Phase 1 Transport Layer

Using TCP/IP connections ensures that all connections are fully bi-directional. By establishing a connection from one node to all others prior to sending any messages it can be ensured that the information is as reliable as possible as far as accessibility is concerned.

This phase can serve both as a means to detect connectivity issues, as well as providing a set of connections to be used by the OEP application layer. Whether or not this is a protocol matter or it is a detection mechanism is debatable. The main point is that prior to engaging in any higher level of communication, all possible connections are established, and this fact is essential to the workings of the higher level protocol set forth in the following.

This phase should be regarded as atomic, meaning that the application should, preferably, not react to any event until the last connection attempt has been made. After the last attempt has been made, the application could respond normally to events. For the purpose of the next phase is assumed that the newly created connections are kept in a separate pool. Not reacting to events, does not imply that they are ignored, rather the monitoring preferably relies on the queue mechanisms implemented in the protocol stack of the operating system.

On the receiving side receiving side connection are merely accepted and store in a separate pool where EvRecv event are triggered from.

Phase 2 Application layer OSM exchange

The purpose of this protocol is to enable nodes 24 of the storage system to inform other nodes 24 of changes in its OSM, and in return gathering information to maintain a VOW that is consistent with the current state of the whole storage system composed of these nodes 24.

Key Features:

Connections are used as if they are unidirectional in the sense that messages are sent solely on connections initiated by the sender and messages are received solely on accepted connections.

Sending is done atomically, and prior to listening for events.

Receiving is done asynchronously.

Connections are closed after sending or receiving.

OSM are sent under two conditions, in response to receiving one from another node, or if the local OSM has been changed as a consequence of any other type of internal event. They could also be sent periodically if so desired.

The exchange is timed, in order to prevent "starvation" due to connectivity faults occurring prior to completion of the exchange.

Taking these key features into account all that is needed in order to determine if an exchange has been fully completed is a list of which nodes 24 an answer is expected from. When receiving a message on a previously accepted connection, the aforementioned list is preferably consulted to determine if the received message was expected or not. If it was not expected the receiving node 40 preferably engages itself in an exchange from phase 1.

When all expected messages have been received the whole exchange is complete. If one or more expected messages are not received with a certain timeframe the exchange has failed and should be retried. To this end a timer 30 is preferably used. It should be started after sending is complete, and stopped whenever no further messages are expected. In the event that the timer 30 expires, the exchange has failed and should be restarted (from phase 1).

Rather than using a traditional request-response type of protocol, where the type of message is distinguishable at the packet level, the suggested solution uses a single type of packet. For the sake of the clarity the terms question and answer is used to describe the role of a packet. This role is determined by events and timing.

Figure 12:
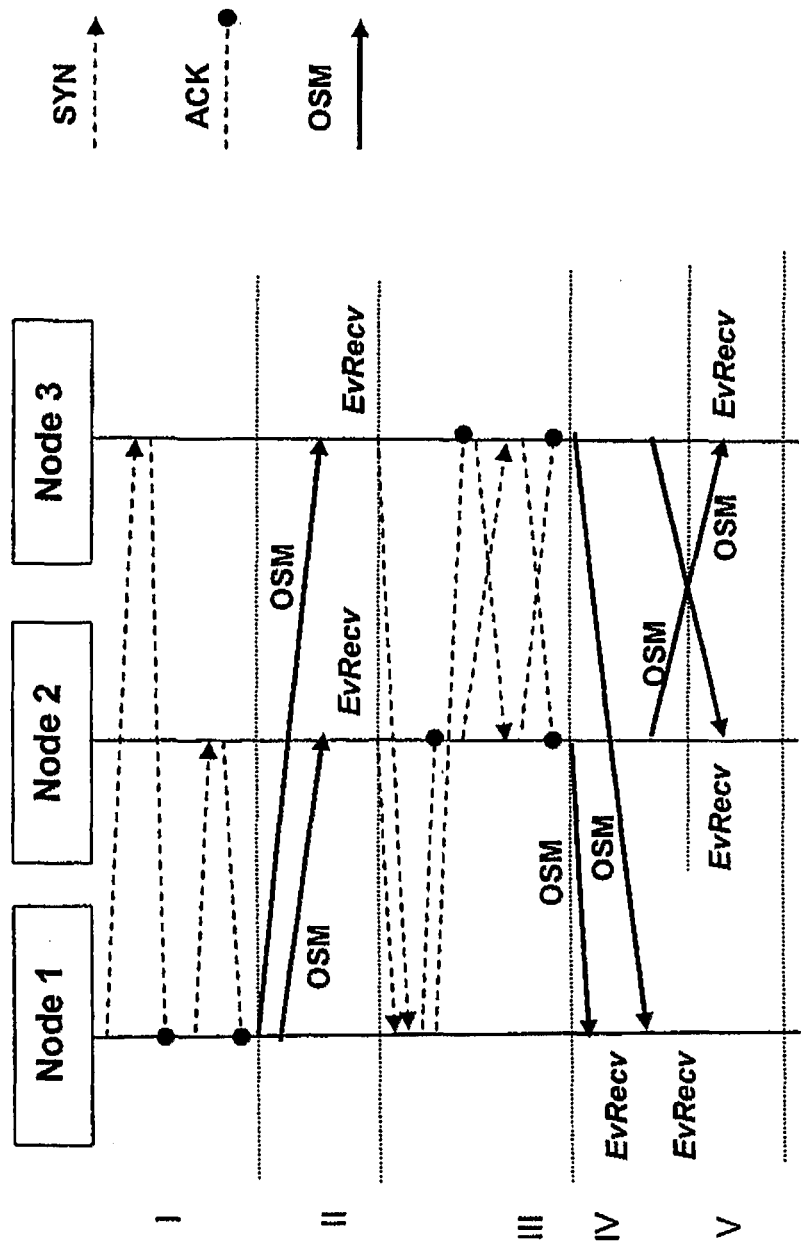

In FIG. 12. node N1 is initiating an exchange.

The sequence of events in FIG. 12 is as follows:

I. N1 establishes TCP/IP connections all other node in the system. The connection attempts all succeed, hence they accepted at the receiving ends.

II. N1 is sending its OSM on all of these connections, which in turn are closed at the N1 end. These messages constitute questions as seen from N1. N1 lists all the recipients as having an answer pending. The receivers react with an EvRecv thus updating their OSM, and closing the connection at their end. When all messages are sent a timer 30 is started.

III. The receivers see the incoming OSM as a question, since they do not have any answers pending from N1. They enter phase 1 and successfully establish TCP/IP connections, which are in turn accepted by the receiving ends.

IV. N2 and N3 send OSM to all the connections established in step III. Node N1 is not listed as pending an answer by N2 and N3. N1 interprets the incoming OSM as answer messages since it does have both N2 and N3 on the list of pending answers. Like in step II the connections are closed by both the sending and receiving sides. N1 has received all expected messages and stop the timer 30. N2 and N3 are both sending OSM to each other at roughly the same time. Each sender e.g. interprets the messages as being questions. By the time both N2 and N3 have completed the sending phase, they can have marked each other as pending an answer. A timer 30 is started in both nodes.

V. By the time nodes N2 and N3 have completed the atomic sending action they can have marked each other as pending an answer. Thus when the OSMs arrive at the two nodes both would interpret the received OSM as an answer. Herein lays the key to avoiding an unstoppable avalanche.

VI. By the time steps IV and V are done, all of the nodes have received their pending answers and stopped the timers 30, which is the completion of the whole exchange.

The following is intended to set forth the manipulations done to OSMs and VOWs in response to a well defined set of events. How the event handlers are triggered is not dealt with.

Internal events, EvDs

This is the response to detected changes in the operations state of locally hosted DS replica. Let m be the DSG id, n be the node id of the local node and st is the detected state of Dm.

The Dm@Nn is preferably set to AB when st indicates failure, and to RR whenever st indicates that Dm is operational.

Database Event, EvConf

Change to the configuration, could signify addition or removal of resources to the system, in which case the OSM and the rest of the VOW elements are preferably dimensioned to reflect to new system configuration. Please note that if a special value for priority is chosen to indicate that a given DS replica is supposed to be considered as offline, changes in the priority to and from such a value are similar to additions and deletions as described below.

Additions

New entries in the configuration table is preferably examined to determine:

If a new node(s) has been added, in which case a new column should be added to the VOW elements. The whole column, D?Nn, should then be set to AB.

If a new DSG has been added, in which case a row should be added to the VOW elements. The state should be set as AB for all Nn. The hosting node should start monitoring the new DS replicas.

If a new DS replica of already known DSG, which preferably requires the hosting node to monitor this new replica. No changes to the VOW in this case, since it would already be present. The monitoring can eventually trigger this cell to change state in the OSM on the hosting node.

Deletions

When entries are removed from the configuration, the new configuration is preferably examined to determine:

If a node has been removed; in which case the corresponding column in the VOW elements should be removed. In the event that it is the node itself, which has been removed, it should activate the mc_expire, and stop listening on the OEP port.

If a DSG has been removed, in which the corresponding row in the VOW elements should be removed. All hosting nodes should stop monitoring of the DS replica.

If a DS replica has been removed; in which case the Dm@Nm should be set to AB in all VOW elements. The hosting node should treat this as if the DS replica has failed, and it should stop monitoring this particular DS replica.

Connection Success, EvSucc

Any successful connection attempt from Nx to Ny, preferably updates the OSM in Nx as follows:

1) Set as absent all the unreachable DSs in node Ny, in x view (Vx):

Vx:D?@Ny=AB where Vx:Dm@Ny=UR

This rule can ensure that node Nx may initiate an OSM exchange, whenever the connectivity to Ny has previously been lost.

Connection Failure, EvFail

Any failed attempt to establish a TCP/IP connection or sending OSMs to a node, Ny, preferably updates the VOW as follows:

1) If Nx cannot reach Ny. Ny cannot reach Nx. So the DSs of Nx are unreachable from Ny:
   Vy:D?@Nx=UR where Vy:Dm@Nx≠AB,
2) DSs of Ny are unreachable from Nx:
   Vx:D?@Ny=UR where Vx:Dm@Ny≠AB
3) Vy is marked as unreliable.

The key point with the above rules, is it that whenever Nx sees Ny as unreachable, it can be assume that Ny also sees Nx as unreachable, thus leaving any Dm host by either node unreachable for each other. Since this particular type of events can occur as part of an ongoing OSM Exchange, these changes does not constitute any additional need for information exchange between nodes.

Examples

Referring to FIG. 13, assuming the N1 fails to connect to node N2, it preferably marks all DS replicas in N2 as unreachable in its OSM and it preferably marks all DS replicas hosted at N1 as unreachable in the V2 element of the VOW. Element V2 in the VOW is demoted to the unreliable state. Note that the V3 element is not affected, since a connection has successfully been established from N1 to N3.

The example in FIG. 14 depicts the same scenario as seen from N2. Since N2 is isolated it detects failures on both connections to N1 and to N3. Following the rules it can mark DS replicas hosted by N1 and N3 as unreachable in its OSM, and update VOW elements V1 and V3 to indicate that DS replicas hosted by N2 are not accessible from those two nodes.

As these two examples illustrate does the rules regarding connection failures not yield the desired consistent view within all nodes 24. The isolated node, does however reach a VOW that reflects the current state of the system. The two connected node preferably exchange information in order to get the complete picture.

Message reception, EvRecv

The response to receiving an OSM from another node, Ny. This results in updates to the OSM and the rest of the VOW in the receiving node Nx according to the following rules:
1) The y view (Vy) in the VOW is set to the one received, and the information is reliable:
   a. Vy=Received OSM
   b. Vy is set to reliable.
2) Nx and Ny can see each other, so they can see each other's DSs status as they can be seen locally
   a. Vx:D?@Ny=Vy:D?@Ny
   b. Vy:D?@Nx=Vx:D?@Nx
3) If node n and node y can see each other, and the info about Nn is reliable, they can see each other's DSs status as they can be seen locally. So for all Vn where x≠n and n≠y and Vn is reliable:
   Vn:D?@Ny=Vy:D?Ny; if neither is UR
   Vy:D?Nn=Vn:D?Nn; if neither is UR
4) If node n cannot be reached either by Nx or by Ny, then Nn cannot reach y either. So for all Vn where x≠n and n≠y and Vn is unreliable
   If Vy:D?@Nn contains at least one UR and no RR
   Vn:Dm@Ny=UR; iff Vn:Dm@Ny≠AB Examples Referring to FIG. 15, assuming N1 receives the OSM from N3 during an OSM Exchange initiated by N1, in a scenario where N2 has been isolated. Since N1 has initiated the exchange the connectivity loss toward N2 has already been detected by N1. In the figures below, the VOW elements in the right column are marked V1-V3, and the received OSMs in the left column are marked using a hashmark (#) followed by the node number. The cells in the VOW that are update using the aforementioned rules are also marked.

V3 is replaced by the received message as per rule (1a, 1b). Rules (2,3) yields no changes, but rule (4) tells that N2 cannot see DS replicas hosted by N3. Compared to the examples shown for the EvFail event, all 3 nodes has VOW which is consistent with the current state of the system after a single OSM exchange between the connected nodes.

Assuming that the connectivity problem, which caused N2 to be isolated is fixed, and that N1 receives a message from N2 in an OSM exchange initiated by N2.

Referring to FIG. 15, from rules (1a,1b) element V2 is replaced with the received message and upgraded to reliable; from rule (2) the V1:D?@N1 now reflects that the DS replicas hosted by N2 are accessible; from rule (3) V3:D?@N2 now reflects that N3 should be able to access the DS replicas hosted by N2. At this point the VOW at node N1 is consistent with the actual state of the system. Following the protocol, N1 and N3 can send their updated as well, thus bringing about identical OSMs in all three nodes 24.

The next examples show how the rules are used when dealing with odd scenarios where the connectivity does not adhere to the expected behavior of an IP based network 18. To this end a fully operational system, where connectivity between nodes N2 and N3 fails is assumed. In such a scenario both of the nodes N2 and N3 would initiate a full OSM exchange (OEP phase 1 & 2), with node N1. The VOW depicted in FIG. 17 show N1 receiving OSM from N2 after seeing that of N3.

Only the rules 1.a and 1.b are applicable in this case, and the resulting VOW is fully consistent with the actual state of the system, both in terms of the actual visibility and the reliability of the individual elements.

The situation as seen from N2 is shown in FIG. 18.

Only the rules 1.a and 1.b are applicable, and as with N1 the information in the VOW reflects the state of the system.

Connection Requests

Since the OSM exchange is preferably done on top of TCP/IP (or other connection-oriented protocol) the connection requests are separate events from receiving messages. There are no updates to the VOW necessary in response to a connection request. This type of event only has relevance for the OSM Exchange Protocol.

Periodical Events, EvCycle

There are no periodical changes to the VOW per se, but as mentioned earlier is the first phase of the OEP required to be performed regularly and that in turn could trigger one or more EvFail or EvSucc events. Thus in the response to expiration of a timer 30 governing the desired detection rate of connectivity issues, connection attempts to all other nodes are to be made, and EvFail is preferably used in response to failed attempts and E Succ in response to successful attempts—Whenever either of those two events triggers a change in the OSM, the node preferably initiates a full exchange.

Deriving an ADL

With a proper end condition for the OSM exchange and with a VOW in each node that consistently depicts the accessibility of each DS replica is possible to generate and ADL which can be conveyed to any interested party. The following elaborates a suggested set of rules to do just that.

The first thing that needs to be established is which kind of sub-division of the whole system the node belongs to. The |sub-division| (size of the sub-division) equals the number of reliable VOW elements.

If |sub-division|*2=|configured nodes| the system is in a split-brain division. It this case it is unsafe to make changes to the master assignments. It is however valid to remove references to unreachable master replicas (See below.)

If |sub-division|*2>|configured nodes| the node is part of a majority subdivision, and it is safe to make changes. (See below.)

If |sub-division|*2<|configured nodes| the node is part of a minority sub-division, in which case it is safe to make changes. (See below.)

Once the sub-division has been identified it is possible to devise a set of rules that govern each of three types of sub-division. All of these rules rely on the visibility of the individual DS replicas. The visibility for a DS replica is found by consulting its cell in every reliable VOW element, and counting the number of cell with an RR state.

Majority Rules

The following is preferably applied for each DSG in the configuration—
1) Build a short list of potential DS master replicas. This short list preferably contains all DS replica of equal visibility, where the visibility is the highest found the specific DSG.
2) If the current master is not on the short list, choose the replica on the short list with the highest configured priority. Substitute the replica for the DSG in the ADL with this new candidate. If current master is in short list keep it.
3) If the list is empty (or the visibility is 0), no replica from the DSG is visible within the sub-division. The replica for this DSG should be removed from the ADL.

Minority Rules

For each visible DSG—
1) If all configured replicas are visible within the sub-division, keep the current master in the ADL
2) If one or more replicas are hosted in an unreachable node, remove the DSG from the ADL.

Finalizing

The ADL generated by the preceding rules, is preferably filtered based on actual connectivity prior to conveying it to the subscribers.

If Dm@Nn=UR remove the entry from ADL.

High Availability

In order to ensure that the monitoring process does not constitute a single point of failure, there should be a least two instances of the Monitoring Process per node. Traditionally high availability setups are built around standalone ready-made server components, which by themselves are unaware of HA. In such a setup, it common to find an encapsulating component that governs the role of each of the server component is terms of an active instance and a hot/cold standby instance, as well as controlling failover situations. It is not uncommon that a failover is opaque and that it is disruptive, albeit very briefly.

The task of establishing HA for the Monitoring Process could easily follow a different approach by having multiple fully operational instances, which in a sense leans more towards, what is usually known as a load balancing setup. This can alleviate the need of distinguishing between active and standby instances and eliminate the failover concept with its inherent disruptions (albeit minute).

The solution proposed in this chapter follows a hybrid approach, in the sense that there are (at least) two fully operational instances, but only one doing the real work (which can be called for the sake of clarity "active" while the other one can be called the "stand-by"). The stand-by can just be faked for outgoing connections related to OSM sending (OEP phase 2) and ADL communication to Access Gateway.

Some data can be necessarily shared between the active instance and the stand-by one in order to simulate the responses to the OEP phase 1 outgoing messages:

When receiving an OSM from a node N in the active instance, on an external connection, it preferably relays this onto a dedicated Intra MP multicast group. Receiving an OSM from this multicast group, is no different for receiving it directly save the action of closing the connection.

In order to provide the active and stand-by instances mechanism, Load Balancer features are preferably used. Specifically, a pool of two servers can be created and an iRule for persistence can be created to force going only to one instance:

```
rule PriorityFailover {
    when CLIENT_ACCEPTED { persist uie 1 }
}
```

Figure 19:
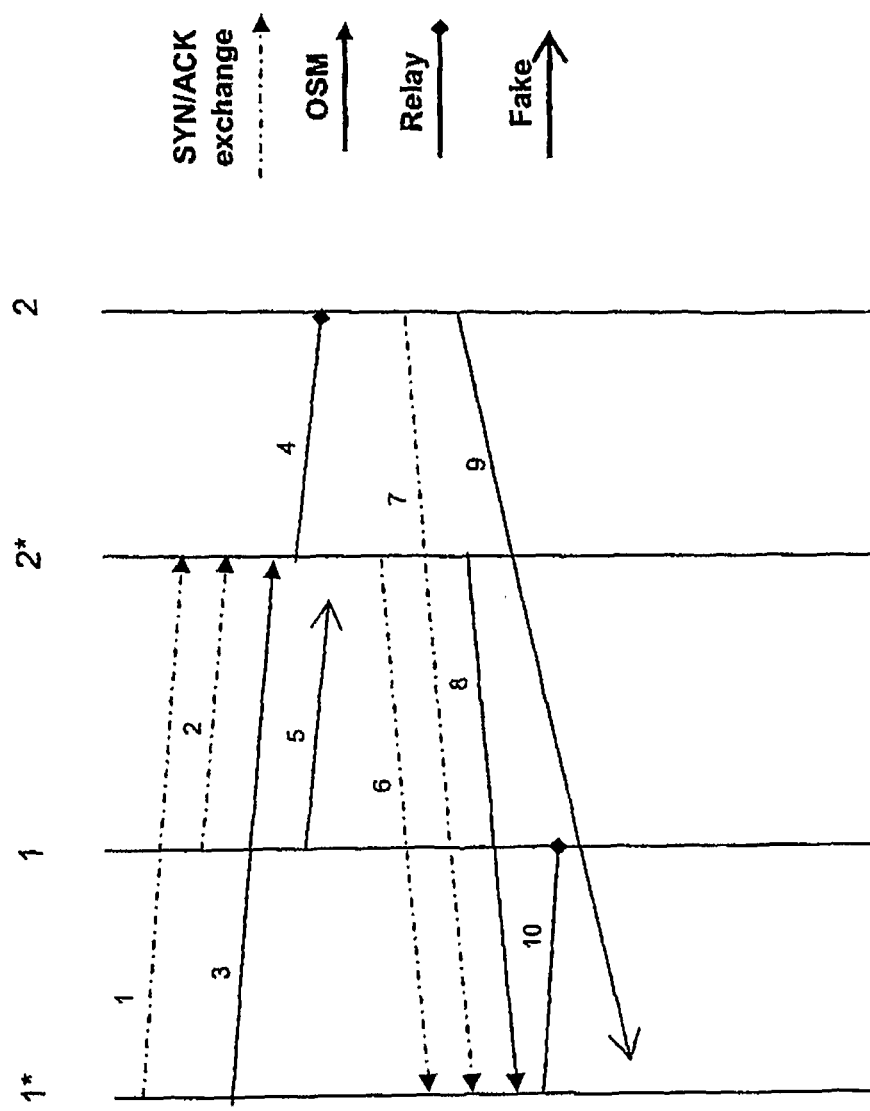
FIG. 19 shows the normal case where node 1 initiates the OSM exchanging.

FIG. 19 is provided in order to explain how solution works in terms of messages relayed and work provided by stand-by instances of the processes.

FIG. 19 shows the flow in a 2-node system (e.g. node 1 and node 2), wherein '*' stands for the active instance of the process in a given node. For simplicity, SYN/ACK exchange is represented with a single arrow.

FIG. 19 covers the normal case where node 1 initiates the OSM exchanging. The following steps take effect:

The diagram covers the normal case where node 1 initiates the OSM exchanging. The following steps lake effect:
1. Active instance 1* does the SYN-ACK exchange
2. Stand-by instance does the same in very nearly future or past (this is assured because any other previous OSM exchange-relay will preferably have "synchronize" their timers)
3. Active instance 1* send its OSM. OSM is received in node 2 active instance as LB should address only one instance.
4. After receiving it, and previous to answer, node 2 active instance relays the message to the stand-by instance.
5. Stand-by instance of node 1 thinks that it has sent the OSM too, but in fact it hasn't sent it. In fact it fakes it to keep the same status as the active instance.
6. After that, active instance of node 2 initiates the SYN-ACK
7. Stand by instance of node 2 initiates the SYN-ACK
8. Active instance of node 2 sends it OSM to node 1 (received in active instance because of LB configuration).
9. Stand by instance of node 2 thinks that it sends its OSM to node 1 too, but it only fakes it, as explained in step 5
10. After receiving OSM from node 2, node 1 active instance relays the message to the stand-by instance. Both instances reset their timers to the same value (because of the intra-node low latency network times, it is assured that next timer 30 expiration can happen almost simultaneously).

Several possibilities are covered with the solution:

If instance 2* crashes after relaying, stand-by instance can detect situation (e.g. if load balancing function LB is fast enough) and can really send the OSM (instead of being faked) with correct info as it has perform the SYN-ACK phase. If detection is not so fast, instance 1* can retry the whole OEP after a time, and node 2 would successfully respond (stand-by instance can have had time to get active)

If instance 2* crashes before relaying instance 1* can retry as explained previously.

If instance 1* crashes before sending the OSM, instance 1 can get active and retry the whole procedure as explained (because fake OSM was not sent).

If instance 1* crashes after sending the OSM, stand-by instance can receive the response, e.g. if LB switches fast enough. If LB is not fast enough, or 1* crashes before relying, the timer 30 mechanism can take place (Obviously if LB is not fast enough, node 2 might not be able to connect in some cases and no response is sent, but timer 30 mechanism can operate in 1 and final situation can be solved)

If instance 1* crashes after relying, stand-by process can get active, and thus the functionality should not be affected.

Implementation Details

Preferably, a mechanism is selected for deciding (at the instance level) which is active and one is stand-by in order to fake messages.

An advantageous option could comprise a method like "amIActive( )" and implementing inside any mechanism which provides the solution.

One option could be sending a message to the VIP periodically. If the instance receives the message then it is the active one, any other case it is the stand-by one, information which could be stored in any Boolean variable to be checked. Note anyway, that the message is sent to the same VIP:port where OEP is received, so reception of the message should not alter normal reading of OEP messages (i.e. OEP works in a way where first all messages are sent and then all answer are compiled, so do not use another thread and use the main loop for the active-standby verification)

Further Implementation Details

Single threaded application using Unix/Linux "select(2)"—system call as the core component, and with dedicated sub-processes to handle surveillance of DS replicas and database changes.

The sub processes can be either under the control of the main process, where the main process takes care of establishing a socketpair(2), which is used as stdin and stdout by the sub processes, or they could run as independent processes communicating through some type of network 18 protocol. The latter approach has been suggested for a separate implementation of monitoring the state of the DS replicas.

The following outlines the flow of the main process.

Startup, or Initial Condition

When the monitoring process is started it preferably goes through the following steps in order to reach to a fully operational condition.

1) Retrieve the system configuration, if the node itself is absent from configuration: wait t second and restart.
2) Dimension the VOW
3) Set all entries in the VOW to AB
4) Start surveillance of all locally hosted DS replicas
5) Start a timer 30 (with the length of an external pulse).
6) Listen for DS state change events, using EvDS as response.
7) When timer 30 expires
8) Start listening for incoming TCP/IP connections
9) Issue EvCycle At this point the process should be fully operational, and capable of issuing regular messages to the local Access Gateway process.

Main Loop

1) Start timer 30 for internal pulse
2) Start timer 30 for external pulse
3) Send OSM on all initiated external connections, list all recipients as asked
4) Build read file descriptor set from pool of internal service sockets, accepted connections.
5) Listen for events on internal service socket and accepted external socket and for timer 30 expirations
    a. When internal timer 30 expires; use mc_refresh as response
    b. When external timer 30 expires:
        Use EvCycle as response; if OSM is altered use mc_expire, derive ADL and use mc_config to convey new ADL to subscribers.
    c. When TCP/IP connection requests arrive
        Confirm connection using accept(2) and add new socket to pool of accepted connections.
    d. When Ds state change
        Use EvDs as response: If OSM is altered use EvCycle
    e. When incoming OSM exchanges arrives
        Use EvRecv in response; if originator is not listed as asked use EvCycle.
    f. When DataBase changes
        Use EvConf in response; if OSM is altered use EvCycle
6) Return to 1.

Intra Node ADL Communication

Once the ADL is clear within a node, it should be transmitted to the access gateways in order to be used.

The protocol can comprise three messages:

EXPIRE; Issued when it detects changes in the overall operational state of the entire system. In particular, at least the following situations are identified:
    when the current node is removed from configuration, an expire message should be bent to stop processing traffic (just a secure mechanism)
    when the node runs in a minority group not being able to managing any traffic.

REFRESH; Issued regularly. This message acts like a heartbeat, where its absence can trigger the Access Gateway process (or any other process) to discard its internal copy of the information previously received.

CONFIG; Issued when a new configuration has been derived. Reaction to this message could vary depending on the data changed: if the Active list has changed it is presumed that a panic-like reaction could happen, whilst if it is a change in the replica info, a relax-like reaction is expected. Therefore, config message should provide this info some way.

Message Implementation Examples

CONFIG and REFRESH Packets

The CONFIG and the REFRESH messages are structurally identical and consist of a header and a variable list (The current DSG List).

| Offset (Bytes) | Length (bytes) | Name | Comments |
| --- | --- | --- | --- |
| 0 | 1 | TYPE | CONFIG REFRESH |
| 1 | 1 | Version | |
| 2 | 4 | TTL | Total Seconds information is valid |
| 6 | 2 | Reason | Two bytes reason, MSB byte being a change in Active list (or data) whilst LSB reflecting a change in replica list (or data) |
| 8 | 2 | NDSG | Number of DS groups: $0 \leq n \leq 13103$ Let this number be m |

-continued

| Offset (Bytes) | Length (bytes) | Name | Comments |
|---|---|---|---|
| 10 | 2 | DSGID | DS group number: $0 \leq n < 2^{16}$ |
| 12 | 2 | Master Present & number of Nodes | Least significant bit in least significant byte can indicate whether there is a master for that DS (which would be in the first node). For example 0x0000 would indicate no master while 0x0001 would indicate that there is a master. The other bits in LSB are reserved for future use. The MSB indicates the number of nodes holding a replica (max 255). |
| 14 | 2 | NODEID | First node holding replica of first DS group $0 \leq n < 2^{16}$ |
| 16 | 1 | MEM_U SAGE | $0 \leq n < 100\%$ This represents the percentage of free memory. As explained previously, Most significant bit would indicate whether DS is fully operational or degraded. |
| 17 | 2 | NODE ID | Second node holding replica of first DS group |
| 19 | 1 | MEM_U SAGE | Memory usage in that replica (It should be the same in all replicas, but just for the case) Remaining nodes |
| 14 + 3 * k(0) ... | 2 | DSGID | Remaining DS |

The reason filed could be the same in the config and subsequent refresh messages. Anyway, it this imposes some state maintenance problem to provided HA intra node, refresh messages could just sent the 0x0000 value (i.e. this field is irrelevant in the refresh message).

EXPIRE Packet

| Offset (Bytes) | Length (bytes) | Name | Comments |
|---|---|---|---|
| 0 | 1 | TYPE | EXPIRE |
| 1 | 1 | Version | |
| 2 | 1 | Reason | |

The reason field is just to inform which is the reason for the expire message, in case some applications wants to ignore it depending on the circumstances Currently, the functionality of many of the nodes 24 and servers in telecommunications and/or information systems are implemented by computer-based apparatuses. Accordingly, computer programs comprising computer-readable program codes are loaded in computer-based apparatuses of these systems causing them to behave according to a predefined manner, as determined by the respective program codes, which are in accordance to the functionality specified for the servers/nodes 24 these apparatuses implement. Thus, those skilled in creating and/or modifying computer programs, would, without departing of the teachings of the present invention, readily apply them to create and/or modify computer programs suitable to be loaded in a computer-based database server or in a computer based database client, so as to make them to behave according to any of the described embodiments.

This invention shows a technique that solves the issue of assigning master replicas in a system that fulfills the requirements for a centralized Telecom database. High availability and geographical redundancy are provided by the several copies of the same data being geographically distributed. Even if the complete site is down due to a disaster, the system can continue giving service.

The possibility of adding as many DSGs as needed provides high capacity and scalability. Redundancy scalability is possible too, since more DSs can be added to a partition.

The deployment is flexible; the distribution of DSs in the system can be done as desired, with no restriction.

The access to any data in the database is done through any of the nodes 24 that are pan of the system, and in a transparent way, without the need of knowing where the data is located.

Being a decentralized solution, avoids the problem of selecting a supervisor process, in charge of deciding who should be the master DSs in the DSGs. It solves the problem of selecting a master in a simple way, eliminating a possible single point of failure, the supervisor process.

It simplifies the architecture and resolution of conflicting situations, as for instance two supervisor processes being appointed, due to a link failure that creates two different subnets in the system.

Having subnets in the system, due to network 18 failures, is solved in a way that guarantees consistency and high service rate, since in most cases all the data in the database can be available, as would be apparent from the following examples.

Figure 20:
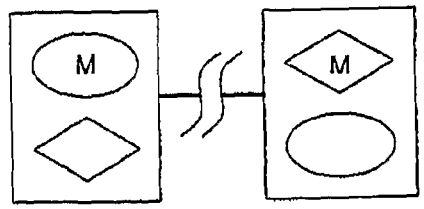
FIG. 20 shows network failure in a two node system.

For instance, in a two network system, with two DSGs, that have two DSs each one of them. Both nodes 24 have a DS of each DSG, as it is shown in the FIG. 20. An "M" marks the DSs acting as masters.

According to the above description and since each subdivision is half of the system, the master for each DSG remain. The whole data in the database is available; either through a node or the other, and consistency is kept.

Figure 21:
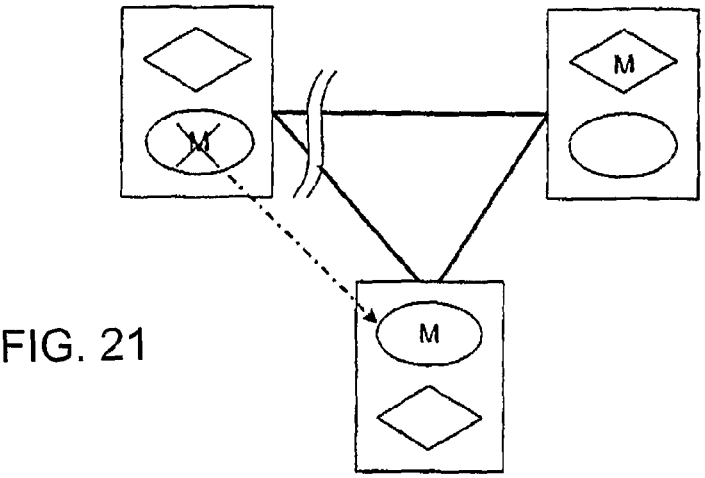
FIG. 21 shows network failure in a three node system.

In a three node system, however, the subnetwork problem may lead to a change in mastership, as can be seen in the example in FIG. 21 that shows a three node system, with three DSGs and three DSs per DSG:

In this example as the subnetworks created are not half of the system, the isolated node lost the mastership, and it is transferred to a node in the subnetwork with the majority of the nodes 24. Again consistency is kept and the data is fully accessible from the two-node subnetwork. The isolated node won't be able to provide service, though.

Figure 22:
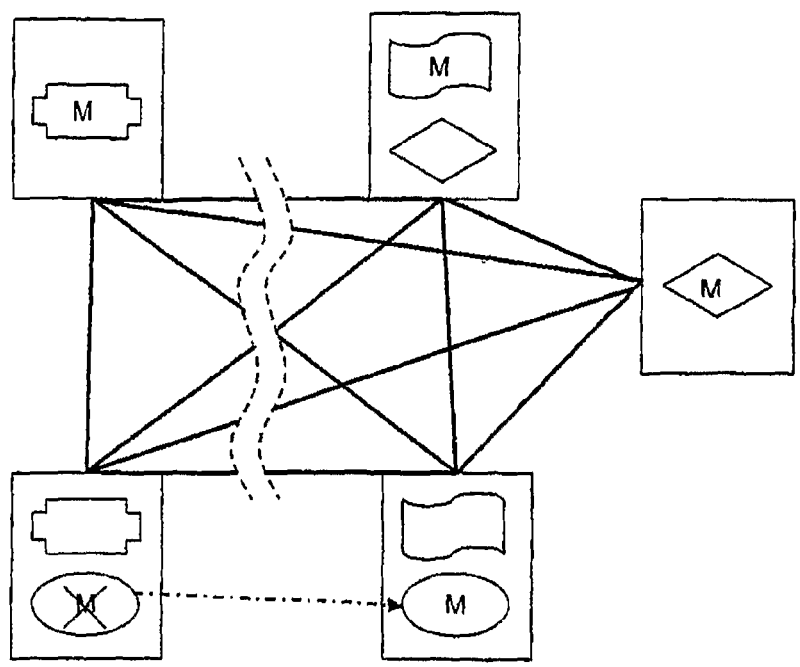
FIG. 22 shows network failure in a five node system.

But it doesn't always happen like that. In FIG. 22, a five node system, with three different DSGs, the subnetwork with less than half of the nodes 24 of the system would continue working.

In this case, the subgroup of two nodes 24 provides access to the data in one of the four DSGs, and the three-node subgroup provides access to the other three DSGs. All the data stored is accessible and consistency is assured.

Abbreviations
  ADL Active DG List
  AG Access Gateway
  DS Data storage element
  DSG Data Storage Group.
  MP Monitor Process.
  OEP OSM Exchange Protocol
  OSM Operational State Matrix. The information exchanged between nodes
  VOW View of the World. Accumulated set of all the OSMs of the system Although the invention has been described in detail in the foregoing embodiments for the purpose of illustration, it is to be understood that such detail is solely for that purpose and that variations can be made therein by those skilled in the an without departing from the spirit and scope of the invention except as it may be described by the following claims.

The invention claimed is:

1. A method for a transmitting node in a telecommunications network, wherein data is distributed into one or more data storage groups (DSG), and wherein data related to a DSG is replicated into a plurality of data storage elements (DS) distributed along a system comprising one or more nodes of the network, the method comprising the steps of:
    establishing a bi-directional connection via a network interface of the transmitting node with a plurality of other nodes in a transport layer of the network;
    sending from the network interface messages to the plurality of other nodes comprising an operational state matrix (OSM), which includes information held by the transmitting node about the operational state of all the replicas of the DS of each DSG, wherein the operational state of a replica in an OSM comprises reachability information indicating, for each of the one or more DSGs: that it is absent in a node, or that it is hosted by a node, or that it is unreachable from a node;
    forming a list of the plurality of other nodes as having an answer pending with a processing unit of the transmitting node in a memory of the transmitting node;
    receiving at the network interface a message from at least some of the other nodes, each received message comprising an OSM including information held respectively by each of said other nodes about the operational state of all the replicas of the DS of each DSG, and which are interpreted by the processing unit as answer messages from the list of the plurality of other nodes to the messages sent in the sending step, and which indicates that an OSM information exchange with the plurality of the other nodes is complete;
    deciding with the processing unit a node hosting the master DS replica of each DSG based on a view of the world (VOW), which is derived based on the received OSMs, and which includes an accumulated set of OSMs with respect to each DSG on every node of the system;
    detecting with the processing unit changes in a VOW derived by the transmitting node with respect to each DSG on every node of the system; and
    sending from the network interface messages comprising changes in the VOW to the other nodes.

2. The method as described in claim 1 including the step of the processing unit starting a timer when the OSM has been sent to all the other nodes.

3. The method as described in claim 2 including the step of the processing unit stopping the timer when an OSM is received by the network interface from all the plurality of other nodes.

4. A method as described in claim 3 including the step of resending from the network interface the OSM of the node to one of the plurality of other nodes after a predetermined period of time has passed and an OSM from the one of the plurality of other nodes has not been received by the network interface.

5. The method as described in claim 1 including the step of storing a replica of at least one data group of a plurality of data groups of data stored in the DS, in a DS of at least one other node.

6. The method as described in claim 1 including the step of requesting through the network interface data at a data group disposed in at least one other node.

7. The method as described in claim 1 including the step of sending updates from the network interface to the DSs of the plurality of DSGs.

8. The method as described in claim 1 including the step of determining by the processing unit a second node of the plurality of nodes as hosting a master DS replica of a DSG in a third node of the plurality of nodes, which hosted the master DS replica, when communication between the network interface and the third node is lost.

9. The method as described in claim 1 including the step of processing assignation of incoming signaling in a node related to data of a certain DSG with at least one access gateway element (AG) to the plurality of the nodes, the AG knowing which DS of a DSG is the master DS replica of the DSG, each DS of the DSG accessible from the network interface.

10. The method as described in claim 9 including the step of compiling a last update and status of each node of the plurality of nodes by a primary monitoring process with the processing unit to determine the node hosting the master DS replica for a DSG.

11. The method as described in claim 10 wherein the compiling step includes the step of forming a configuration with the primary monitoring process which lists all DS replicas in terms of which DSG each DS belongs to, which node each DS is hosted, and a priority within the DSG the DS is associated with in which it acts as a master replica.

12. The method as described in claim 11 including the steps of:
    the processing unit producing an active DS list (ADL) derived from the configuration;
    publishing the ADL to the AG; and
    the AG processing the assignation of incoming signaling related to data of a certain DSG by using the ADL.

13. The method as described in claim 12 including the step of the processing unit deriving the ADL from the VOW.

14. A computer program on a non-transitory computer readable medium for performing a method as claimed in claim 1, when loaded into one or more computer-based apparatuses.

15. A method for a receiving node in a telecommunications network, wherein data is distributed into one or more data storage groups (DSG), and wherein data related to a DSG is replicated into a plurality of data storage elements (DS) distributed along a system comprising one or more nodes of the network, the method comprising the steps of:
    accepting a connection attempt received by a network interface of the receiving node from a transmitting node via the network;
    receiving an operational state matrix (OSM) at the network interface from the transmitting node, which includes information held by the transmitting node about the operational state of all the replicas of the DS of each DSG, wherein the operational state of a replica in a OSM comprises reachability information indicating, for each of the one or more DSGs: that it is absent in a node, or that it is hosted by a node, or that it is unreachable from a node;
    sending, responsive to the step of receiving, from the network interface the receiving node's OSM to the transmitting node and at least one other node in the network via the network, which includes information held by the receiving node about the operational state of all the replicas of the DS of each DSG;
    forming a list with the processing unit in a memory of the node which list includes at least the other node as having an answer pending; and
    receiving a message at the network interface from the other node comprising an OSM including information held by said other node about the operational state of all the replicas of the DS of each DSG, which is interpreted by the processing unit as an answer, and which indicates that an exchange with the other node is complete; and receiving at the network interface from the transmitting node changes in a view of the world (VOW), which is derived by the transmitting node based on the received OSMs, and which includes an accumulated set of OSMs hosted by the transmitting node with respect to each DSG on every node of the system.

16. The method as described in claim 15, including the step of starting a timer by the processing unit when the OSM is sent to the other node by the network interface.

17. The method as described in claim 16 including the step of stopping the timer by the processing unit when the OSM from the other node is received by the network interface.

18. The method as described in claim 15, including the step of updating by the processing unit the node's OSM stored in the memory after the OSM from the transmitting node is received by the network interface.

19. A transmitting node in a telecommunications network, wherein data is distributed into one or more data storage groups (DSG), and wherein data related to a DSG is replicated into a plurality of data storage elements (DS) distributed along a system comprising one or more nodes of the network, the transmitting node comprising:

a network interface through which a bi-directional connection is established with a plurality of other nodes in a transport layer of the network, and from which messages are sent to the plurality of other nodes comprising an operational state matrix (OSM), which includes information held by the transmitting node about the operational state of all the replicas of the DS of each DSG, wherein the operational state of a replica in a OSM comprises reachability information indicating, for each of the one or more DSGs: that it is absent in a node, or that it is hosted by a node, or that it is unreachable from a node;

a memory for storing data; and a processing unit which forms a list of the plurality of other nodes as having an answer pending of the node in the memory, the network interface receiving a message from at least some of other nodes, each received message comprising an OSM including information held respectively by each of said other nodes about the operational state of all the replicas of the DS of each DSG, which are interpreted by the processing unit as answer messages from the list of the plurality of other nodes to the messages sent, and which indicates that an OSM information exchange with the plurality of the other nodes is complete, the processing unit deciding a node hosting the master DS replica of each DSG based on a view of the world (VOW), which is derived based on the received OSMs, and which includes an accumulated set of OSMs with respect to each DSG on every node of the system, the processing unit detecting changes in a VOW derived by the transmitting node, the network interface sending messages comprising changes in the VOW to the other nodes.

20. The node as described in claim 19 including a timer and wherein the processing unit starts the timer when the OSM in the memory has been sent to all the other nodes.

21. The node as described in claim 20 wherein the processing unit stops the timer when an OSM is received by the network interface from all the plurality of other nodes.

22. The node as described in claim 21 wherein the network interface resends the OSM in the memory to one of the plurality of other nodes after a predetermined period of time has passed and an OSM from the one of the plurality of other nodes has not been received by the network interface.

23. The node as described in claim 19 wherein the network interface sends a replica of at least one data group of a plurality of data groups of data stored in the DS to at least one other node, so the replica is stored in a DS of at least one other node.

24. The node as described in claim 19 wherein the network interface sends a request for data at a data group disposed in at least one other node.

25. A receiving node in a telecommunications network, wherein data is distributed into one or more data storage groups (DSG), and wherein data related to a DSG is replicated into a plurality of data storage elements (DS) distributed along a system comprising one or more nodes of the network, the receiving node comprising:

a network interface which accepts a connection attempt from a transmitting node via the network, receives an operational state matrix (OSM) at the network interface from the transmitting node, which includes information held by the transmitting node about the operational state of all the replicas of the DS of each DSG, wherein the operational state of a replica in a OSM comprises reachability information indicating, for each of the one or more DSGs: that it is absent in a node, or that it is hosted by a node, or that it is unreachable from a node; and sends, responsive to having received the OSM from the transmitting node, the receiving node's OSM to the transmitting node and at least one other node in the network via the network, which includes information held by the receiving node about the operational state of all the replicas of the DS of each DSG;

a memory for storing data; and a processing unit which forms a list in the memory which list includes at least the other node as having an answer pending, the network interface receiving an OSM from the other node which is interpreted by the processing unit as an answer, which indicates that an exchange with the other node is complete, after which the network interface receives from the transmitting node changes in a view of the world (VOW), which is derived by the transmitting node based on the received OSMs, and which includes an accumulated set of OSMs hosted by the transmitting node with respect to each DSG on every node of the system.

26. The node as described in claim 25 wherein the processing unit updates the OSM stored in the memory after the OSM from the transmitting node is received by the network interface.

* * * * *

UNITED STATES PATENT AND TRADEMARK OFFICE
CERTIFICATE OF CORRECTION

PATENT NO. : 8,493,978 B2
APPLICATION NO. : 13/122517
DATED : July 23, 2013
INVENTOR(S) : Arribas et al.

It is certified that error appears in the above-identified patent and that said Letters Patent is hereby corrected as shown below:

In the Specification

In Column 2, Line 27, delete "MSC/VLRs," and insert -- MSCs/VLRs, --, therefor.

In Column 3, Line 10, delete "et A1;" and insert -- et Al; --, therefor.

In Column 3, Line 12, delete "2006. IEEE." and insert -- 2006, IEEE, --, therefor.

In Column 3, Line 13, delete "646-651." and insert -- 646-651, --, therefor.

In Column 3, Line 17, delete "Taipei." and insert -- Taipei, --, therefor.

In Column 3, Line 18, delete "USA." and insert -- USA, --, therefor.

In Column 4, Line 46, delete "exchange," and insert -- exchange. --, therefor.

In Column 5, Line 9, delete "hi-directional" and insert -- bi-directional --, therefor.

In Column 6, Line 14, after "reasons." delete "OSM in".

In Column 6, Line 66, delete "exchange," and insert -- exchange. --, therefor.

In Column 9, Line 35, delete "Auc," and insert -- AuC, --, therefor.

In Column 10, Line 45, delete "Multi-matrical" and insert -- Multi-metrical --, therefor.

In Column 10, Line 58, delete "Matrix." and insert -- Matrix, --, therefor.

In Column 11, Lines 38-39, delete "Multi-matrical" and insert -- Multi-metrical --, therefor.

In Column 12, Line 17, delete "connection:" and insert -- connection; --, therefor.

In Column 12, Line 22, delete "nodes:" and insert -- nodes; --, therefor.

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,493,978 B2

In Column 13, Line 36, delete "FIG. 12." and insert -- FIG. 12, --, therefor.

In Column 14, Line 28, delete "D?Nn," and insert -- D?@Nn, --, therefor.

In Column 14, Line 47, delete "removed," and insert -- removed; --, therefor.

In Column 14, Line 51, delete "Dm@Nm" and insert -- Dm@Nn --, therefor.

In Column 15, Line 1, delete "Ny. Ny" and insert -- Ny, Ny --, therefor.

In Column 15, Line 54, delete "Vy:D?Nn=Vn:D?Nn;" and insert -- Vy:D?@Nn=Vn:D?@Nn; --, therefor.

In Column 16, Line 55, delete "E Succ" and insert -- EvSucc --, therefor.

In Column 18, Line 13, delete "mechanism." and insert -- mechanism, --, therefor.

In Column 18, Line 33, delete "lake" and insert -- take --, therefor.

In Column 19, Line 28, delete "VIP:port" and insert -- VIP port --, therefor.

In Column 19, Line 33, delete "verification)" and insert -- verification). --, therefor.

In Column 19, Line 52, delete "configuration:" and insert -- configuration; --, therefor.

In Column 20, Line 9, delete "expires:" and insert -- expires; --, therefor.

In Column 20, Line 17, delete "response:" and insert -- response; --, therefor.

In Column 21, Line 23, delete "NODE ID" and insert -- NODEID --, therefor.

In Column 21, Line 47, delete "circumstances" and insert -- circumstances. --, therefor.

In Column 22, Line 10, delete "pan" and insert -- part --, therefor.

In Column 22, Line 65, delete "the an" and insert -- the art --, therefor.